US008732377B2

(12) United States Patent
Sakaguchi et al.

(10) Patent No.: US 8,732,377 B2
(45) Date of Patent: May 20, 2014

(54) INTERCONNECTION APPARATUS AND CONTROLLING METHOD THEREFOR

(75) Inventors: Hiroaki Sakaguchi, Kanagawa (JP); Hitoshi Kai, Kanagawa (JP); Hiroshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 13/296,846

(22) Filed: Nov. 15, 2011

(65) Prior Publication Data

US 2012/0144079 A1 Jun. 7, 2012

(30) Foreign Application Priority Data

Dec. 6, 2010 (JP) ................................ 2010-271008

(51) Int. Cl.
*G06F 13/372* (2006.01)
(52) U.S. Cl.
USPC ............................ 710/309; 710/117; 710/311
(58) Field of Classification Search
USPC ...................................................... 710/306
See application file for complete search history.

(56) References Cited

U.S. PATENT DOCUMENTS

| 5,553,310 | A  | * | 9/1996  | Taylor et al. ..................... 710/40 |
| 6,523,140 | B1 | * | 2/2003  | Arndt et al. ...................... 714/44 |
| 6,820,165 | B2 | * | 11/2004 | Pannell .......................... 710/313 |
| 7,181,556 | B2 | * | 2/2007  | Gwilt ............................ 710/110 |
| 7,359,994 | B1 | * | 4/2008  | Lakhanpal et al. ................ 710/5 |
| 7,373,444 | B2 | * | 5/2008  | Asano et al. ................... 710/110 |
| 7,394,829 | B2 | * | 7/2008  | Sato ............................. 370/486 |
| 7,457,905 | B2 | * | 11/2008 | Gehman ........................ 710/315 |
| 8,208,496 | B2 | * | 6/2012  | Polland ......................... 370/498 |
| 8,255,644 | B2 | * | 8/2012  | Sonnier et al. ................. 711/154 |
| 2011/0261603 | A1 | * | 10/2011 | Jones et al. ..................... 365/63 |

* cited by examiner

*Primary Examiner* — Ryan Stiglic
(74) *Attorney, Agent, or Firm* — Sony Corporation

(57) ABSTRACT

Certain aspects of an apparatus and method for interconnection may include an interconnection section, a request processing section and a response processing section. The interconnection section may be configured to transfer a request from a master interface bus to a slave interface bus and to transfer a response from the slave interface bus to the master interface bus. A slot number within the request specifies a time slot during which the interconnection section may be permitted to transfer the response to the master interface bus. The request commands the processing section to load the slot number into a management table. The response commands the response processing section to read out the slot number from the management table.

6 Claims, 42 Drawing Sheets

FIG.2

| SIGNAL NAME | SOURCE | EXPLANATION |
| --- | --- | --- |
| ARID[3:0] | MASTER | READ ADDRESS IDENTIFIER |
| ARADDR[31:0] | MASTER | READ ADDRESS |
| ARLEN[3:0] | MASTER | BURST LENGTH |
| ARSIZE[2:0] | MASTER | BURST SIZE |
| ARBURST[1:0] | MASTER | BURST TYPE |
| ARLOCK[1:0] | MASTER | LOCK TYPE |
| ARCACHE[3:0] | MASTER | CACHE TYPE |
| ARPROT[2:0] | MASTER | PROTECTION TYPE |
| ARVALID | MASTER | READ ADDRESS VALID |
| ARREADY | SLAVE | SLAVE ADDRESS READY |

FIG.3

| SIGNAL NAME | SOURCE | EXPLANATION |
|---|---|---|
| RID[3:0] | SLAVE | READ IDENTIFIER TAG |
| RDATA[31:0] | SLAVE | READ DATA |
| RRESP[1:0] | SLAVE | READ RESPONSE |
| RLAST | SLAVE | READ LAST (LAST TRANSFER IN BURST) |
| RVALID | SLAVE | READ VALID |
| RREADY | MASTER | READ READY |

FIG.4

| SIGNAL NAME | SOURCE | EXPLANATION |
|---|---|---|
| AWID[3:0] | MASTER | WRITE ADDRESS IDENTIFIER |
| AWADDR[31:0] | MASTER | WRITE ADDRESS |
| AWLEN[3:0] | MASTER | BURST LENGTH |
| AWSIZE[2:0] | MASTER | BURST SIZE |
| AWBURST[1:0] | MASTER | BURST TYPE |
| AWLOCK[1:0] | MASTER | LOCK TYPE |
| AWCACHE[3:0] | MASTER | CACHE TYPE |
| AWPROT[2:0] | MASTER | PROTECTION TYPE |
| AWVALID | MASTER | WRITE ADDRESS VALID |
| AWREADY | SLAVE | WRITE ADDRESS READY |

FIG. 5

| SIGNAL NAME | SOURCE | EXPLANATION |
|---|---|---|
| WID[3:0] | MASTER | WRITE IDENTIFIER TAG |
| WDATA[31:0] | MASTER | WRITE DATA |
| WSTRB[3:0] | MASTER | WRITE STROBE |
| WLAST | MASTER | WRITE LAST (LAST TRANSFER IN BURST) |
| WVALID | MASTER | WRITE VALID |
| WREADY | SLAVE | WRITE READY |

FIG. 6

| SIGNAL NAME | SOURCE | EXPLANATION |
|---|---|---|
| BID[3:0] | SLAVE | RESPONSE IDENTIFIER |
| BRESP[1:0] | SLAVE | WRITE RESPONSE |
| BVALID | SLAVE | WRITE RESPONSE VALID |
| BREADY | MASTER | RESPONSE READY |

FIG.13A

| WRITE ENABLE WE[0] | ACTION OF SELECTOR 412 |
|---|---|
| 1 | SELECT OUTPUT OF INVALID VALUE OUTPUTTING SECTION |
| 0 | SELECT OUTPUT OF FF AT SUCCEEDING STAGE |

FIG.13B

| WRITE ENABLE WE[0] | ACTION OF SELECTORS 413 AND 414 |
|---|---|
| 1 | SELECT OUTPUT OF FF AT PRECEDING STAGE |
| 0 | SELECT OUTPUT OF FF AT SUCCEEDING STAGE |

FIG.13C

| WRITE ENABLE WE[0] | ACTION OF SELECTOR 415 |
|---|---|
| 1 | SELECT OUTPUT OF FF AT PRECEDING STAGE |
| 0 | SELECT OUTPUT OF VALID VALUE OUTPUTTING SECTION |

| POINTER PTR#00 | 00 |
|---|---|
| POINTER PTR#01 | 11 |
| POINTER PTR#02 | 01 |
| POINTER PTR#03 | 10 |

| ENTRY ENT#00 | uID#A | TRANSACTION INFORMATION A |
|---|---|---|
| ENTRY ENT#01 | BLANK | BLANK |
| ENTRY ENT#02 | BLANK | BLANK |
| ENTRY ENT#03 | uID#B | TRANSACTION INFORMATION B |

FIG.20

| DECISION RESULT FLAG D#i[j] (i,j= 0 ~3) | ACTION OF WRITE DESTINATION ENTRY SELECTION SECTION |
|---|---|
| ALL FLAGS 0 | NEGATE READY SIGNAL |
| SOME FLAG 1 | ASSERT READY SIGNAL. FURTHER, SELECT THAT ONE OF ENTRIES OF D#i[j] = 1 WHICH HAS HIGHEST PRIORITY DEGREE, AND PRODUCE WRITE DESTINATION ENTRY INDEX IND_W[j] (j = 0 ~ 3) |

| | | |
|---|---|---|
| ENTRY ENT#00 | uID#A | TRANSACTION INFORMATION A |
| ENTRY ENT#01 | BLANK | BLANK |
| ENTRY ENT#02 | BLANK | BLANK |
| ENTRY ENT#03 | | TRANSACTION INFORMATION B |

FIG.37

| WRITE DESTINATION ENTRY INDEX IDX_W[j] (j=0~3) | ACTION OF MANAGEMENT INFORMATION REGISTRATION SECTION |
|---|---|
| ONE OF IDX_W[0] TO IDX_W[2] IS 1 | RETAIN uID AND TRANSACTION INFORMATION INTO ENTRY CORRESPONDING TO WRITE DESTINATION ENTRY INDEX IDX_W[j] = 1 IN MANAGEMENT TABLE |
| IDX_W[3]=1 | SET TRANSACTION INFORMATION TO ENTRY #03 IN MANAGEMENT TABLE |

INTERCONNECTION APPARATUS AND CONTROLLING METHOD THEREFOR

BACKGROUND

The present disclosure relates to an interconnection apparatus, and more particularly to an interconnection apparatus which transfers data permitting a split transaction and a controlling method for an interconnection apparatus.

Usually, in order to transfer data from a certain module to a different module, a technique of connecting the modules to each other by a bus is used frequently. That one of the modules which leads data transfer is called master while the module which operates passively is called slave. The module which acts as the master typically is a processor. The module which acts as the slave typically is a memory.

In a system which includes a plurality of buses which are different in bus width or endian system, a bus bridge which carries out data conversion in accordance with the difference in bus width and so forth is provided. Associated buses are connected to the bus bridge to allow data transfer between the buses. The buses and bus bridge are also called interconnect.

In such a bus system as just described, the transfer efficiency can be improved by permitting a split transaction. The split transaction is to control, from among a series of actions or transactions for data transfer, requesting for data transfer and actual data transfer independently of each other. As a bus standard which permits a split transaction, the AXI (Advanced eXtensible Interface) bus and so forth are available.

In the case where a split transaction is permitted, the interconnect such as a bus bridge keeps transaction information relating to transfer between the master and the slave within a period within which the transfer remains unsettled or outstanding. Here, the unsettled signifies a state in which the requested data transfer remains incomplete. Further, the transaction information is information necessary for control of transfer of a response. For example, the transaction information includes a burst length or a burst number when burst transfer is carried out.

The necessity for the interconnect to keep transaction information in the split transaction is described. A bus system is assumed wherein two masters M1 and M2 and two slaves S1 and S2 are connected to an interconnect. It is assumed that, in this bus system, the master M1 issues a request A for requesting for data transfer to the slave S1 first and then the master M2 issues a request B for requesting for data transfer to the slave S2. Also it is assumed that the request A requests for burst transfer while the request B does not request for burst transfer. While the slaves S1 and S2 individually return a response in response to the corresponding request, the order in returning of such responses may not be the same as the order in issuance of the requests A and B. In such a case, in order to decide which one of the responses is to be transferred by burst transfer, the interconnect keeps transaction information corresponding to the requests within periods within which the transfers remain unsettled. The interconnect can control the data transfers appropriately by referring to the transaction information kept therein.

As a technique for keeping transaction information in an AXI bus, a bus system wherein a FIFO (First In First Out) system is provided for each transaction has been proposed and is disclosed, for example, in Japanese Patent Laid-Open No. 2008-41099. The number of such FIFO systems is greater than a maximum value of the number of permissible unsettled transfers. The interconnect stores transfer information corresponding to each request into a FIFO system corresponding to a transaction relating to the request. With the configuration described, when the interconnect reads out transaction information from any of the FIFO systems, there is no necessity to search for a corresponding transaction. Therefore, a readout process of the transaction information can be carried out at a high speed.

SUMMARY

However, in the technique described above, it is difficult to suppress increase of the FIFO size caused by increase of the maximum value of the number of transactions permitted by the bus system. In the case where a FIFO system is provided for each transaction, a number of FIFO systems equal to a maximum value of the number of transactions are provided inevitably. Therefore, the total storage capacity of the FIFO systems increases in proportion to the increase of the maximum value of the number of transactions permitted by the bus system.

Therefore, it is desirable to provide an interconnection apparatus and a controlling method for an interconnection apparatus by which increase of the storage capacity caused by increase of the maximum value of the number of transactions permitted by a bus system can be suppressed.

According to an embodiment of the present disclosure, there is provided an interconnection apparatus including: a buffer adapted to retain a plurality of management tables, each of which retains, from within a bit string, including a bit string for specifying one of a plurality of time slots as a slot specifying bit string, for identifying a transaction process including a transfer process of a request and a transfer process of a response corresponding to the request, a partial bit string obtained by removing the slot specifying bit string from the bit string for the identification of the transaction process in an associated relationship with transaction information for controlling the transfer process of the response, so as to individually correspond to the time slots; a request processing section adapted to retain, when the time slot specified based on the slot specifying bit string relating to the request is a time slot allocated to the interconnection apparatus, the partial bit string and the transaction information in an associated relationship with each other into the management table corresponding to the time slot; a response processing section adapted to read out, when the response is sent back from a slave, the transaction information corresponding to the partial bit string from the management table specified based on the slot specifying bit string relating to the response; and an interconnection section adapted to transfer, when the request is issued from a master, the request to the slave and transfer, when the response is sent back from the slave, the response to the master based on the transaction information.

According to another embodiment of the present disclosure, there is provided also a controlling method for an interconnection apparatus, including retaining, when one of a plurality of time slots each including a bit string for specifying the time slot as a slot specifying bit string which is specified based on the slot specifying bit string relating to a request is a time slot allocated to the interconnection apparatus, a partial bit string obtained by removing the slot specifying bit string from the bit string for the identification of a transaction process including a transfer process of the request and a transfer process of a response corresponding to the request in an associated relationship with transaction information for controlling the transfer process of the response into one of a plurality of management tables which corresponds to the time slot, and reading out, when the response is sent back from a slave, the transaction information corresponding to the partial bit string from the management table specified based on the slot specifying bit string relating to the response.

In the interconnection apparatus and the controlling method for an interconnection apparatus, when a request is issued in a time slot, transaction information is retained into a management table corresponding to the time slot.

The interconnection apparatus may be configured such that the buffer further retains, for each of the management tables, retention order information for specifying a retention order in which the partial bit string and the transaction information are retained into the management table, the request processing section controlling the management table to retain the transaction information in an associated relationship with the partial bit string based on the retention order information, the response processing section reading out, when the response is sent back, the transaction information corresponding to the partial bit string from the management table based on the retention order information. In the interconnection apparatus, transaction information is read out in accordance with the retention order.

In this instance, each of the management tables may include a plurality of entries each of which is a region for retaining the partial bit string and the transaction information, the retention order information including a number of pointers smaller by one than the number of entries provided in the management table in such a state that the pointers indicate entries different from each other, the buffer further including a remaining entry acquisition section adapted to acquire, for each of the management tables, an entry which is not included in the entries indicated by the pointers. In the interconnection apparatus, the number of pointers included in retaining order information is smaller by one than the number of entries provided in the management table.

Each of the management tables may include more than one management information retaining entry which are regions each for retaining, as management information, the transaction information in an associated relationship with the partial bit string, and a transaction information retaining entry which is a region for retaining the transaction information, the request processing section retaining, when any of the management information retaining entries is blank, the partial bit string and the transaction information in an associated relationship with each other into the management information retaining entry whereas, when any of the management information retaining entries is not blank, the request processing section retains the transaction information into the transaction information retaining entry, the response processing section including a plurality of coincidence decision sections adapted to decide whether or not one of the partial bit strings placed in the management table and the partial bit string relating to the request coincide with each other, and a transaction information acquisition section adapted to read out, when coincidence is decided by one of the coincidence decision sections, the transaction information corresponding to the partial bit string with regard to which the coincidence is decided from the management information retaining entry but read out, when incoincidence is decided by all of the coincidence decision sections, the transaction information from the transaction information retaining entry. In the interconnection apparatus, when the management information retaining entries are not blank, only the transaction information is retained.

Each of the management tables may retain the partial bit string and issuance order information representative of an issuance order regarding the request in the transaction process relating to the partial bit string in an associated relationship with the transaction information, the request processing section retaining the partial bit string relating to the request and the issuance order information in an associated relationship with each other into the management table, the response processing section reading out, when the response is sent back, the transaction information corresponding to the partial bit string relating to the response in accordance with the issuance order information from the management table. In the interconnection apparatus, the transaction information is read out in accordance with the issuance order of the request.

In this instance, the issuance order information may include a management number indicative of the issuance order. In the interconnection apparatus, the transaction information is read out in the order of the management number.

In this instance, the issuance order information may further include a top flag representing that the management information is the top in the issuance order and a tail flag representing that the management information is a tail end in the issuance order. In the interconnection apparatus, the transaction information is read out based on the top flag and the tail flag.

Or, the issuance order information may include next position information indicative of a storage position of the next transaction information in the issuance order regarding the request. In the interconnection apparatus, the transaction information is read out based on the next position information.

In this instance, the issuance order information may further include a top flag representing that the management information is the top in the issuance order. In the interconnection apparatus, the transaction information is read out based on the top flag.

In summary, the interconnection apparatus and the controlling method for an interconnection apparatus according to the embodiments of the present disclosure can achieve the advantage that increase of the storage capacity caused by increase of the maximum value of the number of transactions permitted by a bus system can be suppressed.

The above and other features and advantages of the present disclosure will become apparent from the following description and the appended claims, taken in conjunction with the accompanying drawings in which like parts or elements denoted by like reference symbols.

BRIEF DESCRIPTION OF THE DRAWINGS

FIG. 2 is a view illustrating signals which configure a read address channel in the AXI protocol;

FIG. 3 is a view illustrating signals which configure a read data channel in the AXI protocol;

FIG. 4 is a view illustrating signals which configure a write address channel in the AXI protocol;

FIG. 5 is a view illustrating signals which configure a write data channel in the AXI protocol;

FIG. 6 is a view illustrating signals which configure a write response channel in the AXI protocol;

FIGS. 13A to 13C are views illustrating an example of action of selectors of the E register updating circuit shown in FIG. 12;

FIG. 15 is a view showing an example of a configuration of a pointer table of the pointer retaining section shown in FIG. 14;

FIG. 16 is a view showing an example of a configuration of a management table of the management information retaining section shown in FIG. 14;

FIG. 20 is a view illustrating an example of action of a write destination entry selection section of the write destination determination section of FIG. 18;

FIG. 36 is a view showing an example of a configuration of a management table in a third embodiment of the present disclosure;

FIG. 37 is a view illustrating action of a management information registration selection section in the third embodiment of the present disclosure;

DETAILED DESCRIPTION OF THE PREFERRED EMBODIMENTS

In the following, preferred embodiments of the present disclosure disclosed herein are described in detail. The description is given in the following order.

1. First Embodiment (example wherein a time slot is allocated to a management table)
2. Second Embodiment (example wherein the storage capacity of a pointer table is reduced)
3. Third Embodiment (example wherein the storage capacity of a management table is reduced)
4. Fourth Embodiment (example wherein a serial number is retained in a management table)
5. Fifth Embodiment (example wherein a next entry is retained in a management table)

1. First Embodiment

Configuration of the Bus System

Figure 1:
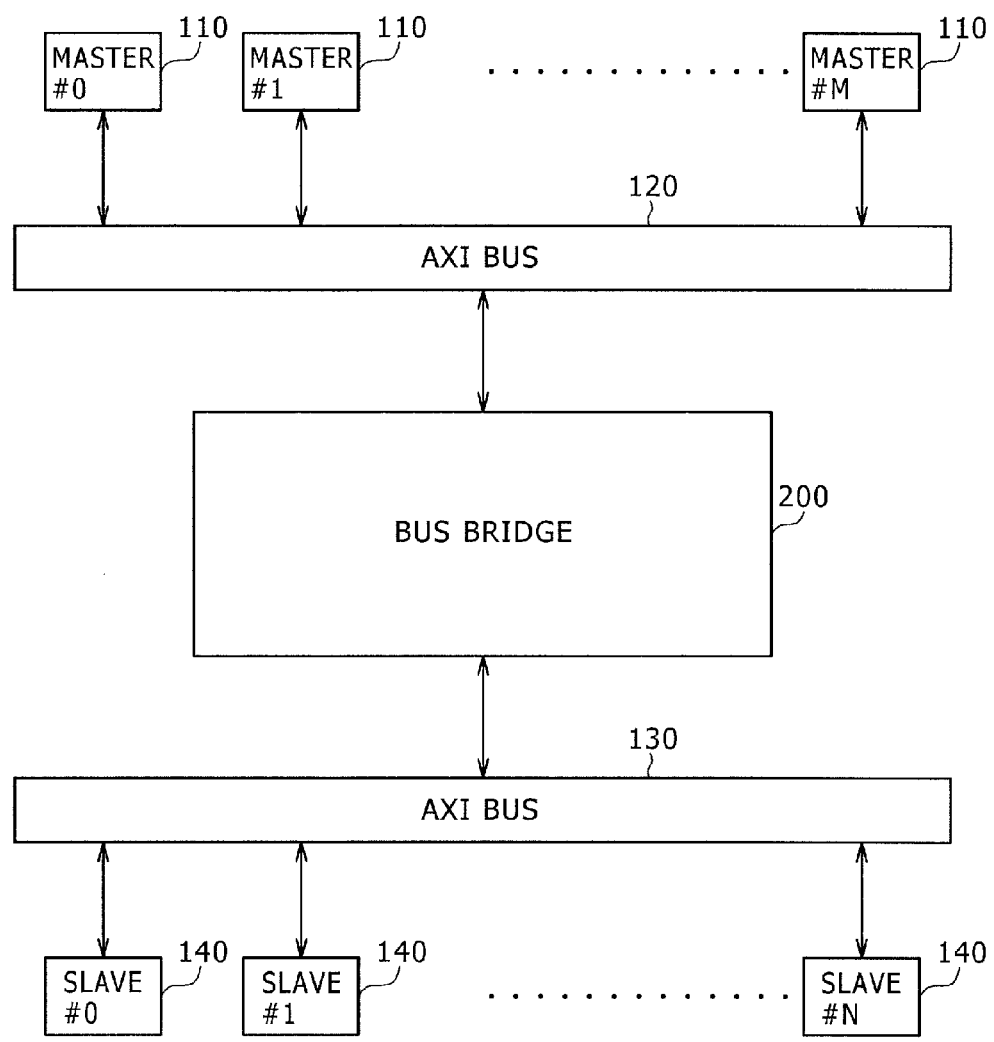
FIG. 1 is a block diagram showing an example of a general configuration of a bus system according to a first embodiment of the present disclosure.

FIG. 1 shows an example of a general configuration of a bus system according to a first embodiment of the present disclosure. Referring to FIG. 1, the bus system shown includes M+1 masters 110, that is, masters #0 to #M, AXI buses 120 and 130, N+1 slaves 140, that is, slaves #0 to #N, and a bus bridge 200. M and N are integers greater than 0. The masters 110 are connected to the AXI bus 120, and the slaves 140 are connected to the AXI bus 130. The AXI buses 120 and 130 are connected to the bus bridge 200.

The masters 110 are connection equipments which lead data transfer while the slaves 140 are connection equipments which act passively. The masters 110 may be, for example, processors. The slaves 140 may be, for example, memories.

The AXI buses 120 and 130 transfer data therethrough in accordance with the AXI protocol. The bus bridge 200 transfers data in accordance with the AXI protocol and carries out data conversion as occasion demands in the data transfer. For example, if the AXI buses 120 and 130 are different in bus width or endian system from each other, then the bus bridge 200 carries out data conversion in accordance with the bus width or the like of the bus of the transfer destination.

Here, in the AXI protocol, a read address channel and a read data channel are prepared for a bus for read action. If a request including a read address is transferred from a master 110 to a slave 140 through the read address channel, then read data is transferred in response to the request from the slave 140 to the master 110 through the read data channel. Further, in the AXI protocol, a write address channel, a write data channel and a write response channel are prepared for a bus for write action. If a request is transferred from a master 110 to a slave 140 through the write address channel and the write data channel, then a write action is carried out in response to the request by the slave 140. Then, a result of the write action is transferred from the slave 140 to the master 110 through the write response channel.

A signal transferred from a master to a slave through the read address channel and the write address channel is hereinafter referred to as request. Further, a signal transferred from a slave to a master through the read data channel and the write response channel is hereinafter referred to as response.

In the AXI protocol, a transfer process of a request and a transfer process of a response to the request form a process of one transaction. It is a fundamental rule in the AXI protocol that the same identifier is applied to a request and a response included in one transaction. On the other hand, if the same identifier is applied to different transactions, then order assurance is made between the transactions.

It is to be noted that the bus bridge 200 of the embodiment described above is an example of the interconnection apparatus of the present disclosure.

Channel Configuration in the AXI Protocol

FIG. 2 illustrates signals which configure the read address channel in the AXI channel. The read address channel is a channel for transmitting a read address from a master 110 to a slave 140. This read address channel includes signals of read address identifier, read address, burst length, burst size, burst type, lock type, cache type, protection type, read address valid and read address ready. From among the signals mentioned, only the read address ready is a signal from a slave 140 while the other signals are signals from a master 110.

The read address identifier ARID[3:0] is a tag of 4 bits for identifying a read address group of a signal. In the AXI protocol, when a master issues a transaction, if it requests a slave to maintain an order relationship, then it applies the same identifier to the transaction. In other words, there is no assurance that an order relationship is maintained between different transactions having different identifiers from each other applied thereto.

The read address ARADDR[31:0] is an address of 32 bits of a read object and is a signal representative of an initial address in burst transfer.

The burst length ARLEN[3:0] is a signal of 4 bits indicative of a number of data in burst transmission. By the burst length ARLEN[3:0], one of data numbers from "1" to "16" is indicated in an encoded form of 4 bits.

The burst size ARSIZE[2:0] is a signal of 3 bits indicative of a transfer size in each burst transfer. One of transfer sizes of "$2^0$," "$2^1$," "$2^2$," "$2^3$," "$2^4$," "$2^5$," "$2^6$" and "$2^7$" is indicated in an encoded form of 3 bits.

The burst type ARBURST[1:0] is a signal of 2 bits indicative of a type of address calculation in burst transfer. In particular, the burst type ARBURST[1:0] can designate one of the FIFO type, successive access and cache line.

The lock type ARLOCK[1:0] is a signal of 2 bits indicative of information for atomic access. In particular, the lock type ARLOCK[1:0] can designate one of normal access, exclusive access and access with lock.

The cache type ARCACHE[3:0] is a signal of 4 bits indicative of information necessary for cache memory control. In particular, the cache type ARCACHE[3:0] indicates control information regarding whether the cache type is cacheable, write-through, write-back or the like.

The protection type ARPROT[2:0] is a signal of 3 bits indicative of information necessary for protection control. In particular, the protection type ARPROT[2:0] can designate any of protection levels of privileged access, unsecure access and instruction access.

The read address valid ARVALID is a valid signal indicative of validity of an address and a control signal. The read address ready ARREADY is a ready signal indicative of whether or not a slave 140 is in a state in which it can receive an address and a control signal. As described above, when both of the read address valid ARVALID and the read address ready ARREADY are asserted, transfer of an address and a control signal is carried out.

FIG. 3 illustrates signals which configure the read data channel in the AXI protocol. The read data channel is a channel for transferring read data from a slave 140 to a master 110. Referring to FIG. 3, the read data channel includes signals of lead identifier tag, read data, read response, read last, read valid and read ready. From among the signals mentioned, only the read ready is a signal from the master 110 while the others are signals from the slave 140.

The read identifier tag RID[3:0] is a tag of 4 bits for identifying a read data group of the signal. The read identifier tag RID[3:0] is produced by a slave and must coincide, in the same transaction, with the read address identifier ARID[3:0].

The read data RDATA[31:0] is read data from the slave 140 by a read transaction. Although a read data bus of a 32-bit width is assumed, the bit width of the read data RDATA varies in response to the bus width. The read data bus has one of bit widths of 8, 16, 32, 64, 128, 256, 512 and 1024.

The read response RRESP[1:0] is a signal of 2 bits indicative of a state of data transfer by a read transaction. The read response includes, for example, a signal indicative of success or failure of read access.

The read last RLAST is a signal indicating that the pertaining data is the last data transfer in a read transaction.

The read valid RVALID is a valid signal indicative of the validity of requested read data. The read ready RREADY is a ready signal indicative of whether or not the master 110 is in a state in which it can receive read data. As described above, when both of the read valid RVALID and the read ready RREADY are asserted, transfer of read data is carried out.

FIG. 4 illustrates signals which configure the write address channel in the AXI protocol. The write address channel is a channel for transmitting a write address from a master 110 to a slave 140. The write address channel is formed from signals of write address identifier, write address, burst length, burst size, burst type, lock type, cache type, protection type, write address valid and write address ready. From among the signals mentioned, only the write address ready is a signal from the slave 140 while the other signals are signals from the master 110.

The write address identifier AWID[3:0] is a tag of 4 bits for identifying a write address group of the signal. The write address AWADDR[31:0] is an address of 32 bits of a write object and is a signal representative of an initial address in burst transfer.

The burst length AWLEN[3:0] is a signal of 4 bits indicative of a number of data in burst transfer. The burst size AWSIZE[2:0] is a signal of 3 bits indicative of a transfer size in each burst transfer. The burst type AWBURST[1:0] is a signal of 2 bits indicative of a type of address calculation in burst transfer. The lock type AWLOCK[1:0] is a signal of 2 bits indicative of information for atomic access. The cache type AWCACHE[3:0] is a signal of 4 bits indicative of information necessary for cache memory control. The protection type AWPROT[2:0] is a signal of 3 bits indicative of information necessary for protection control. The signals mentioned are basically similar to those in the case of the read address channel.

The write address valid AWVALID is a valid signal indicative of the validity of the address and the control signal. The write address ready AWREADY is a ready signal indicative of whether or not the slave 140 is in a state in which it can receive an address and a control signal. As described hereinabove, when both of the write address valid AWVALID and the write address ready AWREADY are asserted, transfer of an address and a control signal is carried out.

FIG. 5 illustrates signals which configure the write data channel in the AXI protocol. The write data channel is a channel for transferring write data from a master 110 to a slave 140. Referring to FIG. 5, the write data channel includes signals of write identifier tag, write data, write strobe, write last, write valid and write ready. From among the signals mentioned, only the write ready is a signal from the slave 140 while the other signals are those from the master 110.

The write identifier tag WID[3:0] is a tag of 4 bits for identifying a write data group of the signal. This write identifier tag WID[3:0] must coincide, in the same transaction, with the write address identifier AWID[3:0].

Then write data WDATA[31:0] is write data into the slave 140 by a write transaction. Although a write data bus of a 32-bit width is assumed here, the bit width of the write data WDATA varies in response to the read data bus width. The write data bus has one of bit widths of 8, 16, 32, 64, 128, 256, 512 and 1024.

The write strobe WSTRB[3:0] is a signal of 4 bits indicative of a byte position to be updated in the memory of the slave 140. One bit of the write strobe WDSTRB[3:0] is allocated to every 8 bits of the write data bus. In other words, the write strobe WSTRB[i] corresponds to the write data WDATA[(8× i)+7:(8×i)].

The write last WLAST is a signal indicating that the pertaining data is the last data transfer in the write transaction.

The write valid WVALID is a valid signal indicative of the validity of the write data. The write ready WREADY is a ready signal indicative of whether or not the slave 140 is in a state in which it can receive write data. As described hereinabove, when both of the write valid WVALID and the write ready WREADY are asserted, transfer of write data is carried out.

FIG. 6 illustrates signals which configure the write response channel in the AXI protocol. The write response channel is a channel for transmitting a result of a write transaction from a slave 140 to a master 110. Referring to FIG. 6, the write response address channel includes signals of response identifier, write response, write response valid and response ready. From among the signals mentioned, only the response ready is a signal from the master 110 while the other signals are those from the slave 140.

The response identifier BID[3:0] is a tag of 4 bits for identifying the write response. The response identifier BID [3:0] must coincide, in the same transaction, with the write address identifier AWID[3:0].

The write response BRESP[1:0] is a signal of 2 bits indicative of a state of data transfer by the write transaction. For example, the write response includes a signal representative of success or failure in write access.

The write response valid BVALID is a valid signal indicative of the validity of the write response. The response ready BREADY is a ready signal indicative of whether or not the master 110 is in a state in which it can receive a write response. As described hereinabove, when both of the write response valid BVALID and the response ready BREADY are asserted, transmission of a write response is carried out.

Configuration of the Bus Bridge

Figure 7:
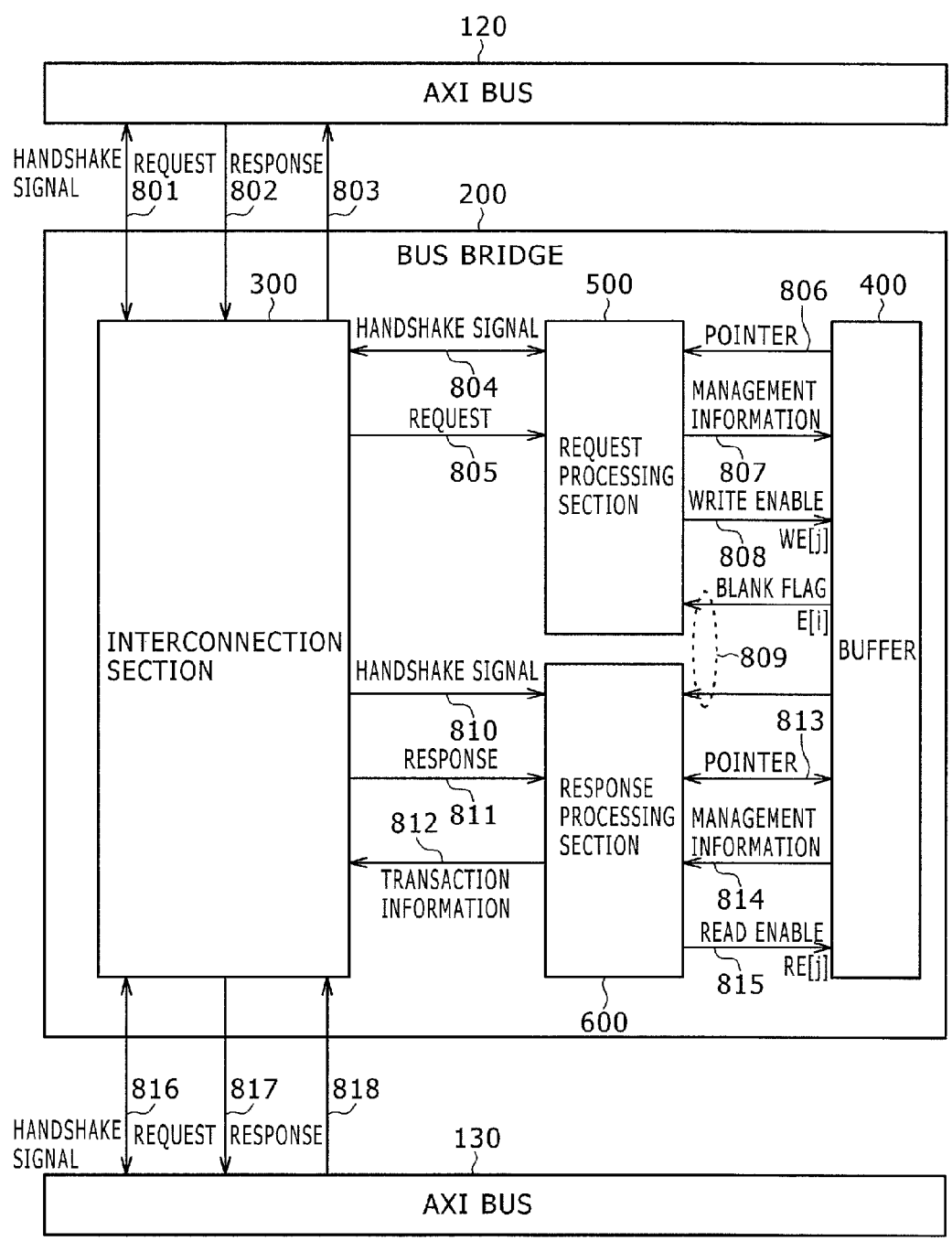
FIG. 7 is a block diagram showing an example of a configuration of a bus bridge shown in FIG. 1.

FIG. 7 shows an example of a configuration of the bus bridge 200 in the first embodiment of the present disclosure. Referring to FIG. 7, the bus bridge 200 includes an interconnection section 300, a buffer 400, a request processing section 500, and a response processing section 600.

The interconnection section 300 transfers a request and a response between a master 110 and a slave 140. In particular, if a request is received from the AXI bus 120 through a signal line 802, then the interconnection section 300 acquires a valid signal relating to the request and acquires a corresponding ready signal through a signal line 816. The valid signal and the ready signal are hereinafter referred to each as handshake signal. The interconnection section 300 outputs a handshake signal to the request processing section 500 through a signal line 804 and outputs a request to the request processing section 500 through a signal line 805. Then, the interconnection section 300 receives a ready signal from the request processing section 500 through the signal line 804 and outputs the ready signal to the AXI bus 120 through a signal line 801. If the valid signal and the ready signal are asserted, then the interconnection section 300 transfers the request to the AXI bus 130 through a signal line 817.

If a response is received from the AXI bus 130 through a signal line 818, then the interconnection section 300 acquires a valid signal relating to the response and acquires a corresponding ready signal through the signal line 801. The interconnection section 300 outputs a handshake signal to the response processing section 600 through a signal line 810 and outputs a response to the response processing section 600 through a signal line 811. Then, the interconnection section 300 receives transaction information corresponding to the response from the response processing section 600 through a signal line 812. Here, the transaction information is information for controlling a transfer process of the response. Details of information included in the transaction information are hereinafter described with reference to FIG. 8. If the valid signal and the ready signal are asserted, then the interconnection section 300 transfers the response to the AXI bus 120 through a signal line 803 based on the received transaction information.

The buffer 400 retains transaction information relating to unsettled transfers. In particular, the buffer 400 retains management information including transaction information and a blank flag and a pointer for specifying management information to be read out. The management information is information which associates a bit string of a high order (hereinafter referred to as "uID") from within a bit string indicative of a transaction identifier ID. The transaction identifier ID is information for identifying a transaction. Meanwhile, the pointer is a variable representative of a region for retaining management information. The blank flag is information of 1 bit indicative of whether or not valid management information is retained in a region indicated by the pointer. Further, the bus system has a plurality of time slots set therein, and the regions for retaining the blank flag, pointer and management information are divided for each time slot. Details of the time slot are hereinafter described.

If management information is received from the request processing section 500 through a signal line 807, then the buffer 400 retains the management information. Further, when a write enable signal is received from the request processing section 500 through a signal line 808, or when a read enable signal is received from the response processing section 600 through a signal line 815, the buffer 400 updates a blank flag. The write enable signal is a signal for the instruction to update one of the blank flags so as to be invalidated. The read enable signal is a signal for the instruction to update one of the blank flags so as to be validated.

The request processing section 500 stores management information into the buffer 400 in accordance with a request. If a request is received from the interconnection section 300, then the request processing section 500 specifies one of the plural time slots from part of a bit string indicative of a transaction identifier ID relating to the request. Here, to the interconnection section 300, one of the plural time slots for transferring each request is allocated periodically by means of a counter or the like which operates in a fixed period. Then, one of the time slots is specified based on the request. For example, in the case where one of four time slots is allocated to the bus bridge 200, the request processing section 500 specifies one of the four time slots by lower 2 bits of the transaction identifier ID. Then, the request processing section 500 decides whether or not the specified time slot is the time slot allocated to the bus bridge 200. If the specified time slot is not the time slot allocated to the bus bridge 200, then the request processing section 500 negates the ready signal so that the request is not transferred to the interconnection section 300. If the specified time slot is the time slot allocated to the bus bridge 200, then the request processing section 500 acquires the value of the blank flag retained by the buffer 400 through a signal line 809 and decides whether or not the management information can be retained into the buffer 400.

If the management information can be retained into the buffer 400, then the request processing section 500 asserts the ready signal and outputs the ready signal to the interconnection section 300. Then, the request processing section 500 acquires a pointer from the buffer 400 through a signal line 806. The request processing section 500 produces management information based on the request and stores the management information into a region of the buffer 400 indicated by the pointer through the signal line 807 and then outputs a write enable signal to the buffer 400 through the signal line 808.

If the management information cannot be retained into the buffer 400, then the request processing section 500 negates the ready signal and outputs the negated ready signal to the interconnection section 300.

The response processing section 600 reads out transaction information corresponding to a response from the buffer 400. If a response is received from the interconnection section 300, then the response processing section 600 acquires a pointer from the buffer 400 through a signal line 813. The response processing section 600 reads out transaction information corresponding to the response from a region indicated by the pointer through a signal line 814. Further, the response processing section 600 outputs a read enable signal to the buffer 400 through the signal line 815. Then, the response processing section 600 updates the pointer based on updating of the blank flag. Details of the updating contents of the pointer are hereinafter described.

Figure 8:
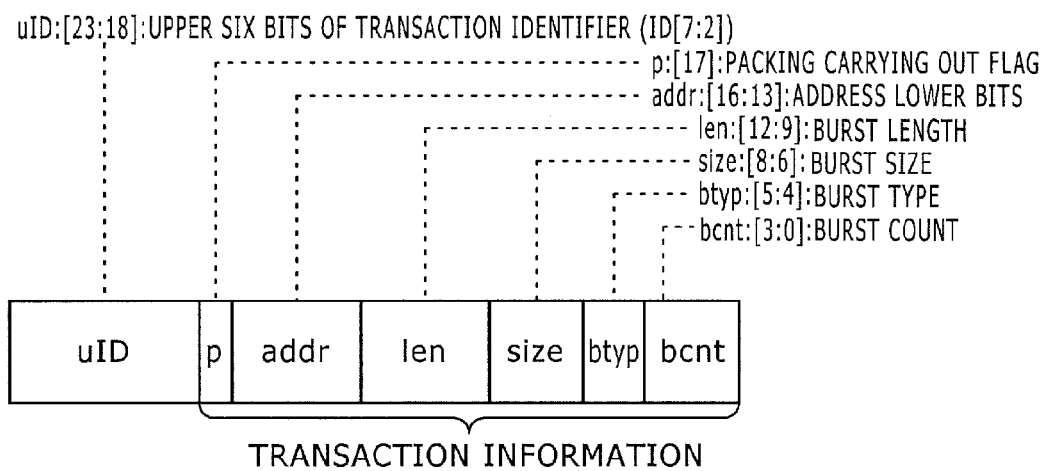
FIG. 8 is a diagrammatic view illustrating an example of management information used in the bus system of FIG. 1.

FIG. 8 illustrates an example of the various kinds of management information in the first embodiment of the present disclosure. The management information includes a uID and transaction information.

The uID is a bit string representative of the transaction identifier ID from which a bit string for specifying a time slot, that is, a slot specifying bit string, is removed. The bit number of the uID is determined from the bit number of the transaction identifier ID and the bit number of the slot specifying bit string. The bit number of the transaction identifier ID is determined based on a maximum value of the transaction number permitted by the bus system. For example, if 256 transactions in the maximum are permitted, then the bit number of the transaction identifier ID is at least 8. For example, if four time slots are set, then the number of bits of the slot specifying bit string is at least two. If the transaction identifier ID is formed from 8 bits and the lower 2 bits of the same are used as the slot specifying bit string, then the uID is upper 6 bits of the transaction identifier ID.

The transaction information is information for controlling a transfer process of a response. The transaction information includes, for example, a packing carrying out flag p, address lower bits addr, a burst length len, a burst size size, a burst type btyp and a burst count bcnt.

The packing carrying out flag p is information of 1 bit representative of whether or not data of a burst object should be packed based on the specifications of the bus. The packing is executed, for example, when data is to be transferred from a bus having a bus width of 32 bits to another bus having another bus width of 64 bits. The address lower bits addr are information of 4 bits for specifying a lower address of the access destination. The burst length len is information of 4 bits indicative of the number of data in burst transfer. The burst size size is information of 3 bits indicative of a transfer size in each burst transfer. The burst type btyp is information of 2 bits indicative of a type of address calculation in burst transfer. The burst count bcnt is information of 4 bits indicative of the number of times of burst transfer.

It is to be noted that the uID in the embodiment described above is an example of the partial bit string in the present disclosure.

Figure 9:
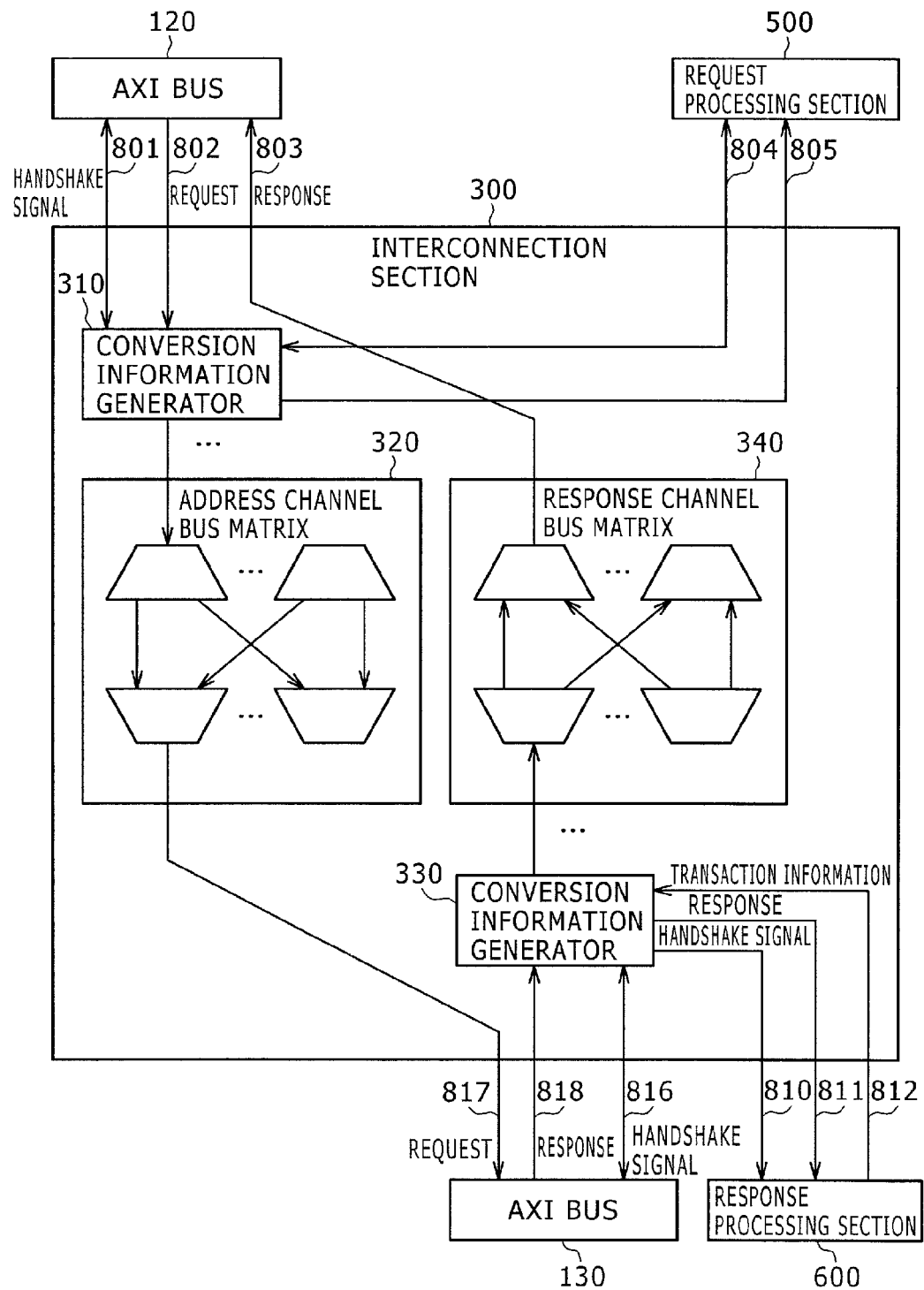
FIG. 9 is a block diagram showing an example of a configuration of an interconnection section of the bus bridge of FIG. 7.

FIG. 9 shows an example of the configuration of the interconnection section 300 in the first embodiment of the present disclosure. Referring to FIG. 9, the interconnection section 300 includes conversion information generators 310 and 330, an address channel bus matrix 320, and a response channel bus matrix 340.

The conversion information generator 310 converts a request received from the AXI bus 120 as occasion demands based on the specifications of the AXI bus 130. If a request is received from the AXI bus 120, then the conversion information generator 310 acquires a handshake signal relating to the request and outputs the handshake signal and the request to the request processing section 500. Then, the conversion information generator 310 receives a ready signal from the request processing section 500 and outputs the ready signal to the AXI bus 120. If the valid signal and the ready signal relating to the request are asserted, then the conversion information generator 310 converts the request received from the AXI bus 120 as occasion demands and outputs the request after the conversion to the address channel bus matrix 320.

The address channel bus matrix 320 transfers the request received from the conversion information generator 310 to the slave of the transmission destination through the AXI bus 130.

The conversion information generator 330 converts the response received from the AXI bus 130 as occasion demands based on the specifications of the AXI bus 120 and the transaction information. If a response is received from the AXI bus 130, then the conversion information generator 330 acquires a handshake signal relating to the response and outputs the handshake signal and the response to the response processing section 600. Then, the conversion information generator 330 receives transaction information corresponding to the response from the response processing section 600. If the valid signal and the ready signal relating to the response are asserted, then the conversion information generator 330 converts the response as occasion demands and outputs the response after the conversion to the response channel bus matrix 340. For example, the conversion information generator 330 couples or decouples the transfer data in response to the system of burst transfer, the bus width of the bus of the transfer destination and so forth indicated by the transaction information.

The response channel bus matrix 340 transfers a response received from the conversion information generator 330 to the master of the transmission source of the request through the AXI bus 120.

Figure 10:
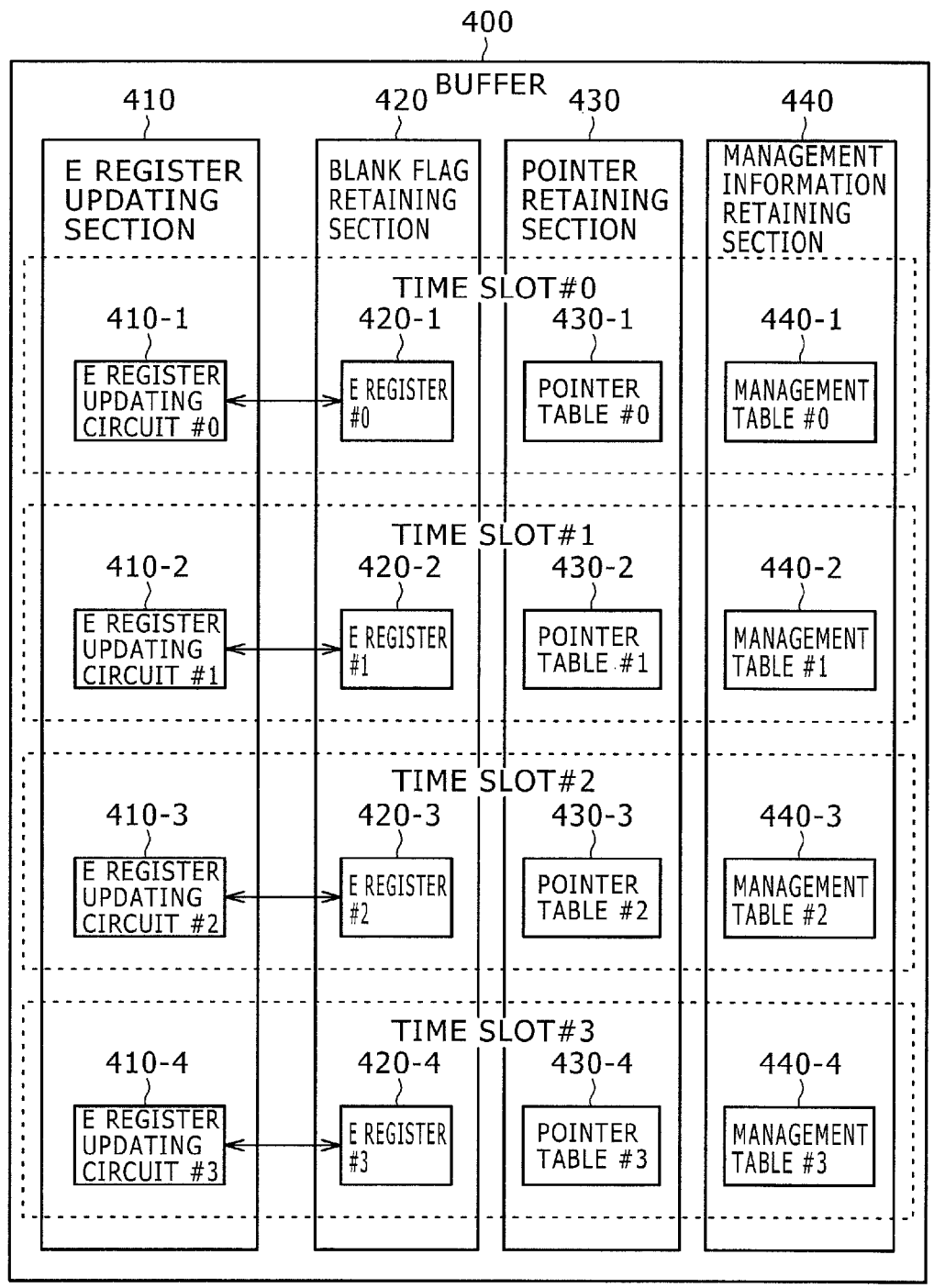
FIG. 10 is a block diagram showing an example of a configuration of a buffer of the bus bridge of FIG. 7.

FIG. 10 shows an example of a configuration of the buffer 400 in the first embodiment of the present disclosure. Referring to FIG. 10, the buffer 400 includes an E register updating section 410, a blank flag retaining section 420, a pointer retaining section 430 and a management information retaining section 440. The E register updating section 410 includes E register updating circuits #0 to #3. The blank flag retaining section 420 includes E registers #0 to #3. The pointer retaining section 430 includes pointer tables #0 to #3. The management information retaining section 440 includes management tables #0 to #3. To the E register updating circuits, E registers, pointer tables and management tables, time slots different from one another are allocated. For example, four time slots #i (i is an integer from 0 to 3) are set. Further, the four sets of E register updating circuit #i, E register #i, pointer table #i and management table #i are provided, and a time slot #i is allocated to the set having the same value i.

The management table #i retains a plurality of pieces of management information. The management table #i includes a plurality of regions for retaining management information. Each of the regions of the management table is hereinafter referred to as entry. The total number of entries provided in the management tables #i is equal to or greater than a maximum number of unsettled transactions which the bus system permits. For example, in the case where the maximum number of unsettled transactions permitted by the bus system is 16, at least four entries are provided in each of the four management tables #i.

The pointer table #i retains a plurality of pointers. Each pointer table #i includes a number of pointers equal to the number of entries provided in the corresponding management table #i, for example, equal to four. Each pointer is a variable indicative of an entry of the corresponding management table #i into which management information is to be retained. Different values from one another are set in the pointers.

Each E register #i retains values of a plurality of blank flags. A blank flag is provided for each of pointers provided in the corresponding pointer table #i. Each blank flag is information of 1 bit indicative of whether or not valid management information is placed in an entry indicated by the corresponding pointer. Here, that management information is valid signifies a state in which transaction information within the management information is placed as an object for reading out in the entry. That management information is invalid signifies a state in which transaction information in the management information is not an object of reading out. More particularly, management information is valid for a period of time after the management information is placed until transfer of a corresponding response is settled within the management information. Any entry in which valid management information is not placed is regarded as blank. For example, if the entry indicated by the corresponding pointer is blank, then "1" is placed as a value of the blank flag, but in any other case "0" is placed as a value of the blank flag.

Each E register updating circuit #i updates the blank flag retained in the corresponding E register #i based on a write enable signal and a read enable signal. Details of the configuration of the E register updating circuit #i are hereinafter described with reference to FIG. 12.

It is to be noted that the pointer in the embodiment described above is an example of the retention order information in the present disclosure.

Figure 11:
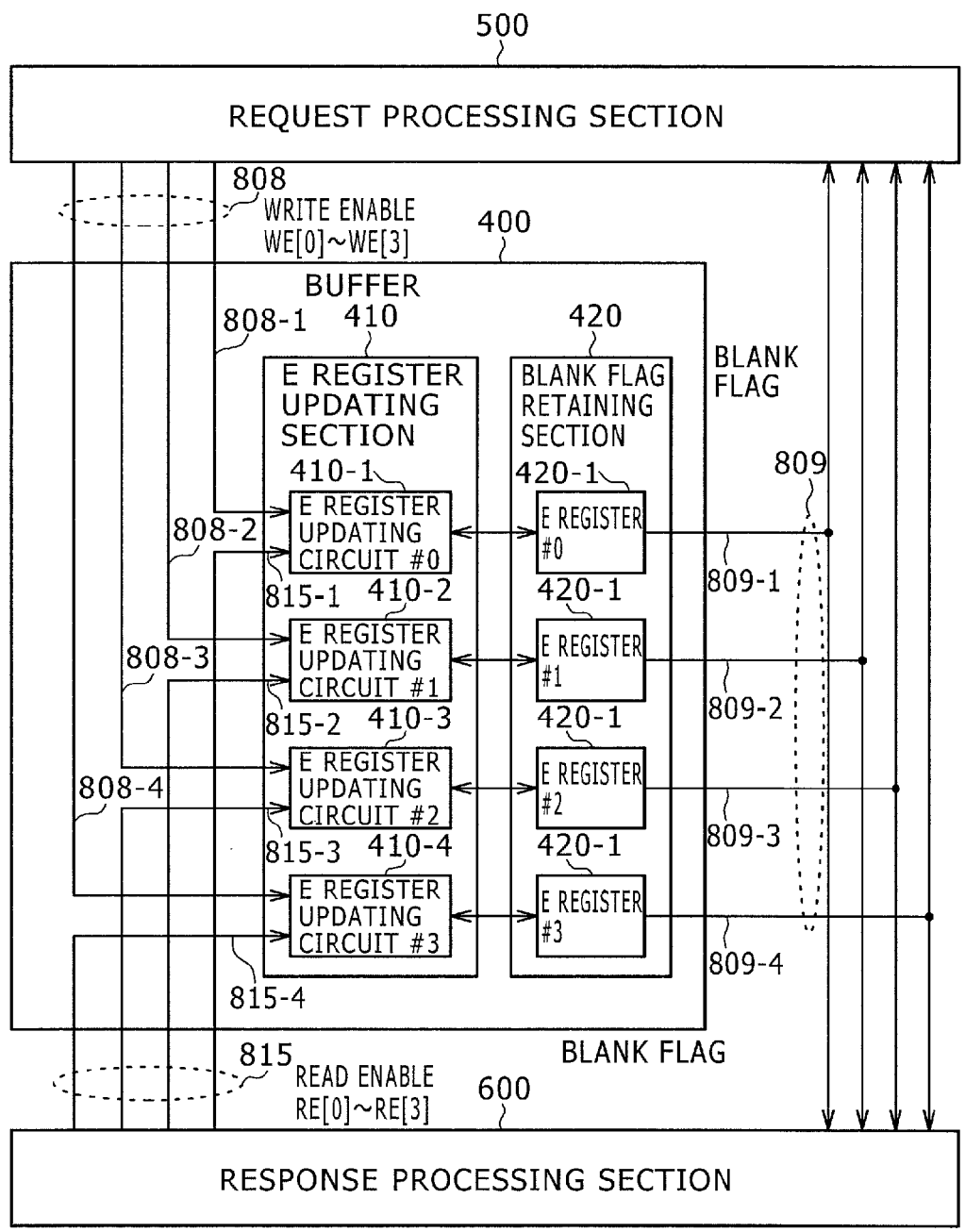
FIG. 11 is a block diagram showing an example of a configuration of an E register updating section and a blank flag retaining section of the buffer of FIG. 10.

FIG. 11 shows an example of a configuration of the E register updating section 410 and the blank flag retaining section 420 in the first embodiment of the present disclosure. To the E register updating circuits #0 to #3, write enable signals WE[0] to WE[3] from the request processing section 500 are inputted through a signal lines 808-1 to 808-4, respectively. The write enable signals WE[0] to WE[3] are signals of 1 bit which instruct the E register updating circuits #0 to #3 to update the E registers #0 to #3, respectively. Meanwhile, to the E register updating circuits #0 to #3, read enable signals RE[0] to RE[3] from the response processing section 600 are inputted through signal lines 815-1 to 815-4, respectively. The read enable signals RE[0] to RE[3] are signals of 1 bit which instruct the E register updating circuits #0 to #3 to update the E registers #0 to #3, respectively. For example, to the write enable signal WE[i] and the read enable signal RE[i], "1" is placed when an updating instruction is to be issued, but in any other case, "0" is placed. In this instance, "1" is not simultaneously placed into two or more of the write enable signals WE[0] to WE[3], and "1" is not simultaneously placed into two or more of the read enable signals RE[0] to RE[3].

The E registers #0 to #3 output a blank flag to the request processing section 500 and the response processing section 600 through signal lines 809-1 to 809-4, respectively.

Figure 12:
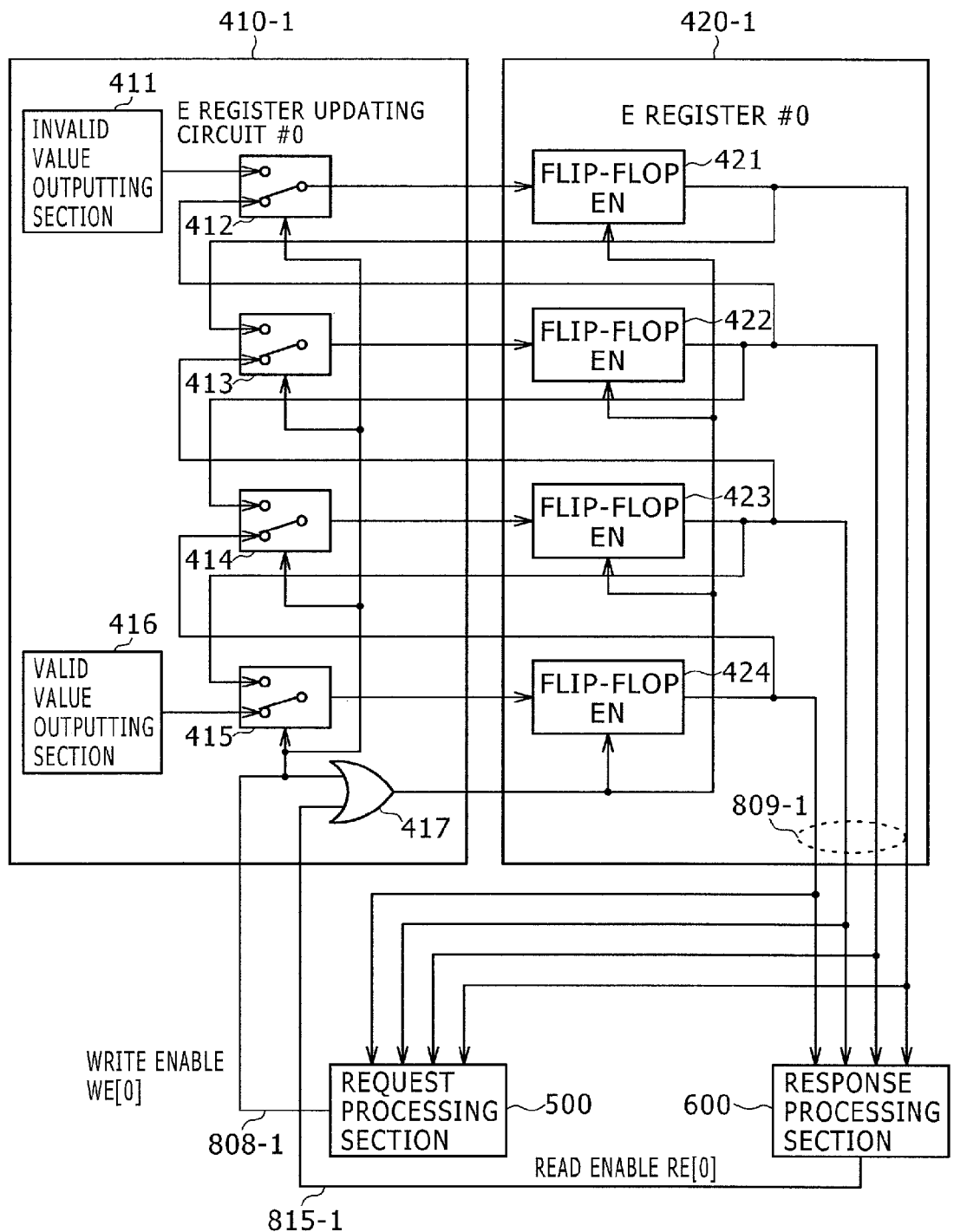
FIG. 12 is a block diagram showing an example of a configuration of an E register updating circuit and an E register shown in FIG. 11.

FIG. 12 shows an example of a configuration of the E register updating circuit #0 and the E register #0 in the first embodiment of the present disclosure. Referring to FIG. 12, the E register updating circuit #0 includes an invalid value outputting section 411, selectors 412 to 415, a valid value outputting section 416 and an OR gate 417. The E register #0 includes flip-flops 421 to 424.

The invalid value outputting section 411 outputs a value for invalidating a blank flag such as, for example, "0" to the selector 412.

The selectors 412 to 415 select one of input values in response to the value of the write enable signal WE[0]. Each of the selectors 412 to 415 has two input terminals and one output terminal. Details of action of the selectors are hereinafter described with reference to FIGS. 13A to 13C.

The valid value outputting section 416 outputs a value for validating a blank flag such as, for example, "1" to the selector 415.

The OR gate 417 outputs a logical OR value of input values thereto. The OR gate 417 has two input terminals. To one of the input terminals of the OR gate 417, the write enable signal WE[0] from the request processing section 500 is inputted, and to the other input terminal of the OR gate 417, the read enable signal RE[0] from the response processing section 600 is inputted. The OR gate 417 outputs a logical OR value of the input values to the enable EN terminal of the flip-flops 421 to 424.

Each of the flip-flops 421 to 424 retains the value of one blank flag, that is, of one bit. When the input value to the enable EN terminal of each flip-flop is "1," the flip-flop updates the current value with the input value to the input terminal. On the other hand, if the input value to the enable EN terminal is "0," then the flop-flop retains the current value irrespective of the input value to the input terminal. Each flip-flop outputs the current value thereof to the request processing section 500 and the response processing section 600. Further, the flip-flop 421 outputs the current value thereof to the selector 413. The flip-flop 422 outputs the current value thereof to the selector 412 and the selector 414. The flip-flop 423 outputs the current value thereof to the selector 413 and the selector 415. The flip-flop 424 outputs the current value thereof to the selector 414.

FIG. 13A illustrates an example of action of the selector 412 in the first embodiment of the present disclosure. To one of the input terminals of the selector 412, an output of the invalid value outputting section 411 is inputted. To the other input terminal of the selector 412, an output of the flip-flop 422 at the succeeding stage is inputted. When the value of the write enable signal WE[0] is "1," the selector 412 selects the output of the invalid value outputting section 411. If the value of the write enable signal WE[0] is "0," the selector 412 selects the output of the flip-flop 422 at the succeeding stage. The selector 412 outputs the selected value to the flip-flop 421.

FIG. 13B illustrates an example of action of the selector 413 and the selector 414 in the first embodiment of the present disclosure. To one of the input terminals of the selector 413, an output of the flip-flop 421 at the preceding stage is inputted. To the other input terminal of the selector 413, an output of the flip-flop 423 at the succeeding stage is inputted. Meanwhile, to one of the input terminals of the selector 414, an output of the flip-flop 422 at the preceding stage is inputted. To the other input terminal of the selector 414, an output of the flip-flop 424 at the succeeding stage is inputted. When the value of the write enable signal WE[0] is "1," each of the selector 413 and the selector 414 selects the output of the flip-flop at the preceding stage. If the value of the write enable signal WE[0] is "0," then the selector 412 selects the output of the flip-flop at the succeeding stage. The selector 413 and the selector 414 output the individually selected values to the flip-flops 422 and 423, respectively.

FIG. 13C illustrates an example of action of the selector 415 in the first embodiment of the present disclosure. To one of the input terminals of the selector 415, an output of the flip-flop 423 at the preceding stage is inputted. To the other input terminal of the selector 415, an output of the valid value outputting section 416 at the succeeding stage is inputted. When the value of the write enable signal WE[0] is "1," the selector 415 selects the output of the flip-flop at the preceding stage. If the value of the write enable signal WE[0] is "0," then the selector 415 selects the output of the valid value outputting section 416. The selector 415 outputs the selected value to the flip-flop 424.

In this manner, every time the write enable signal WE[0] of the value "1" is inputted, the E register updating circuit #0 updates, from among the valid blank flags ("1"), the blank flag retained in the flip-flop of the lowest number to the invalid ("0"). Further, every time the read enable signal RE[0] of the value "1" is inputted, the E register updating circuit #0 updates, from among the invalid blank flags ("0"), the blank flag retained in the flip-flop of the highest number to the valid ("1").

The configuration of the E register updating circuits #1 to #3 and the E registers #1 to #3 is similar to that of the E register updating circuit #0 and the E register #0, respectively.

Figure 14:
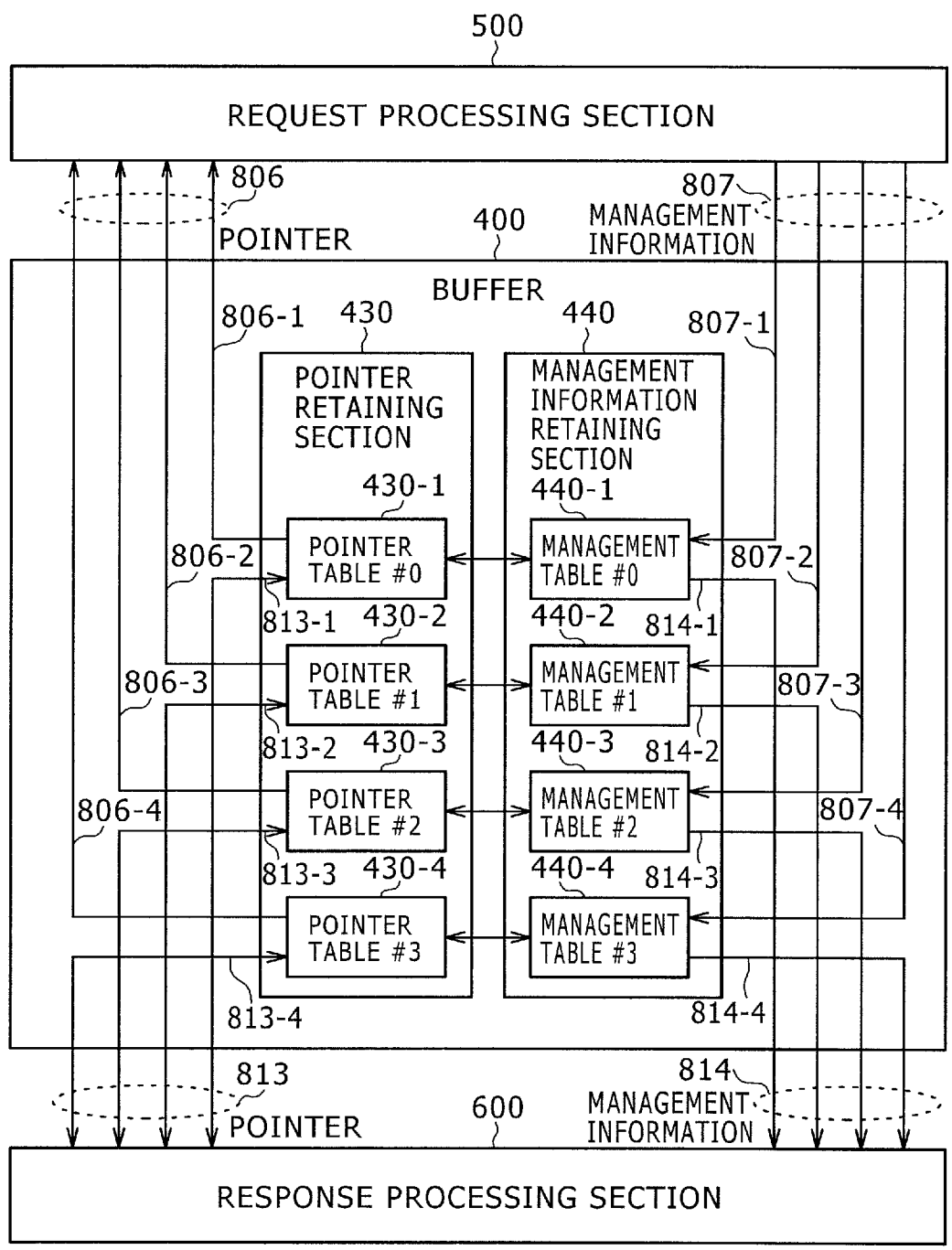
FIG. 14 is a block diagram showing an example of a configuration of a pointer retaining section and a management information retaining section shown in FIG. 10.

FIG. 14 shows an example of a configuration of the pointer retaining section 430 and the management information retaining section 440 in the first embodiment of the present disclosure. Referring to FIG. 14, the pointers retained in the pointer tables #0 to #3 are read out through signal lines 806-1 to 806-4 by the request processing section 500, respectively. Further, the pointers retained in the pointer tables #0 to #3 are accessed by the response processing section 600 through signal lines 813-1 to 813-4, respectively.

The management tables #0 to #3 receive management information from the request processing section 500 through signal lines 807-1 to 807-4, respectively. Further, the management information retained in the management tables #0 to #3 is read out by the response processing section 600 through signal lines 814-1 to 814-4, respectively.

FIG. 15 shows an example of a configuration of the pointer table #0 in the first embodiment of the present disclosure. Referring to FIG. 15, the pointer table #0 retains four pointers PTR#00, PTR#01, PTR#02 and PTR#03. The pointer PTR#00 is the top of the list order of the pointers while the pointer PTR#3 is the tail of the list order of the pointers. Management information is retained in the entries indicated by the pointers in accordance with the list order. Each pointer is a variable of 2 bits, and different values from one another are retained in the pointers. For example, the pointers of "00," "11," "01" and "10" are retained in order from the top. In this instance, the management information is retained in the order of the first entry, fourth entry, second entry and third entry in the management table #0. The configuration of the pointer tables #1 to #3 is similar to that of the pointer table #0.

FIG. 16 shows an example of a configuration of the management table #0 in the first embodiment of the present disclosure. Referring to FIG. 16, the management table #0 includes four entries ENT#00, ENT#01, ENT#02 and ENT#03. The request processing section 500 and the response processing section 600 can randomly access management information placed in the entries in a unit of a bit irrespective of the retaining order of the management information.

Here, in the case where management information is retained, a uID and transaction information which are management information are retained in order beginning with the entry indicated by, from among pointers indicative of blank entries, that pointer at the top in the list order of the pointers. Further, the transaction information is read out in the order in which the management information is retained. An entry from which transaction information is read out is placed into a blank state.

For example, a state is assumed wherein the values of the pointers PTR#00 to PTR#03 are "00," "11," "01" and "10" as illustrated in FIG. 15 and only the entries ENT#01 and ENT#02 in the management table #0 are blank as illustrated in FIG. 16. That one of the pointers PTR#02 and PTR#03 indicative of blank entries which is at the top of the list order of the pointers is the pointer PTR#02. Since the entry indicated by this pointer is the entry ENT#01, management information is retained into the entry ENT#01. The retained management information is read out in the retained order. The configuration of the management tables #1 to #3 is similar to that of the management table #0.

Figure 17:
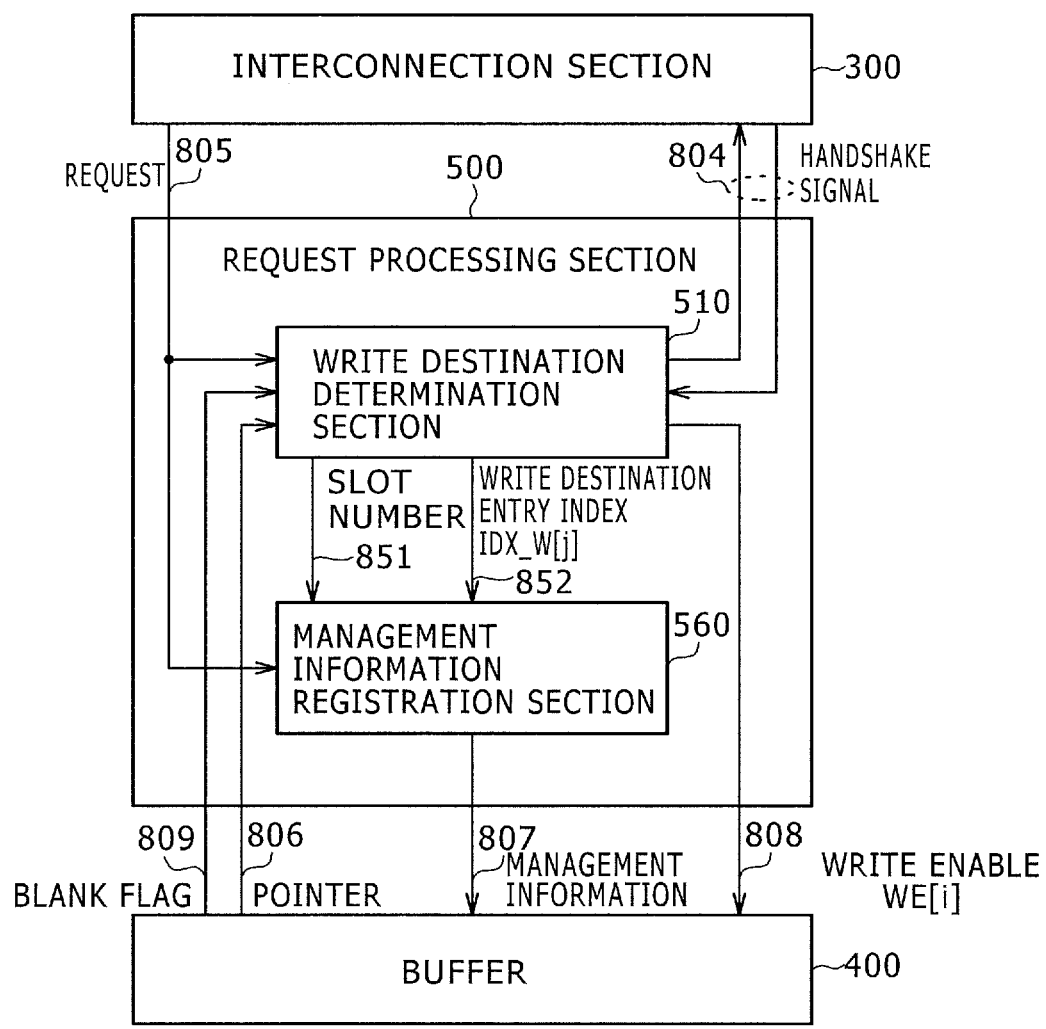
FIG. 17 is a block diagram showing an example of a configuration of a request processing section of the bus bridge of FIG. 7.

FIG. 17 shows an example of a configuration of the request processing section 500 in the first embodiment of the present disclosure. Referring to FIG. 17, the request processing section 500 includes a write destination determination section 510 and a management information registration section 560.

The write destination determination section 510 determines a management table and an entry into which management information is to be retained. If a request is received from the interconnection section 300, then the write destination determination section 510 specifies a time slot from the slot specifying bit string in the request. Different time slots have slot numbers different from one another allocated thereto. For example, the write destination determination section 510 detects lower 2 bits of the transaction ID as the slot specifying bit string and acquires a slot number from the 2 bits to specify a time slot. The write destination determination section 510 acquires a blank flag of a management table corresponding to the specified time slot from the buffer 400.

If a request is not issued in the time slot, or if all blank flags are invalid, the write destination determination section 510 negates the ready signal and outputs the negated ready signal to the interconnection section 300.

If a request is issued otherwise in the time slot and one or more valid blank flags are available, then the write destination determination section 510 acquires a pointer or pointers from the buffer 400. The write destination determination section 510 selects one of entries indicated by the pointers corresponding to the valid blank flags. The write destination determination section 510 generates a write destination entry index IDX_W[j] (j is an integer from 0 to 3) indicative of the selected entry.

The write destination entry index IDX_W[j] is a signal indicative of the selected entry. For example, the number of entries in the management table is four, information of 4 bits individually configured from write destination entry indexes IDX_W[0] to IDX_W[3] of 1 bit individually corresponding to the entries is generated. Then, only the bit corresponding to the selected entry is set to "1" while "0" is placed into the other bits.

The write destination determination section 510 notifies the management information registration section 560 of the slot number through a signal line 851 and notifies the management information registration section 560 of the write destination entry index IDX_W[j] through a signal line 852. Further, the write destination determination section 510 generates a write enable signal WE[i] based on the slot number and outputs the write enable signal WE[i] to the buffer 400.

The write enable signal WE[i] is a signal for the instruction to update a blank flag corresponding to one of the management tables. For example, in the case where the number of management tables is four, information of 4 bits formed from the write enable signals WE[0] to WE[3] of 1 bit individually corresponding to the management tables is generated. Then, only the bit corresponding to the management table to which the designated slot number is allocated is set to "1" while "0" is placed into the other bits.

The management information registration section 560 registers management information into a management table. If a slot number and a write destination entry index IDX_W[j] are received, then the management information registration section 560 generates management information from the request and selects the management table corresponding to the slot number. The management information registration section 560 retains the management information into an entry indicated by the write destination entry index IDX_W[j] in the selected management table.

Figure 18:
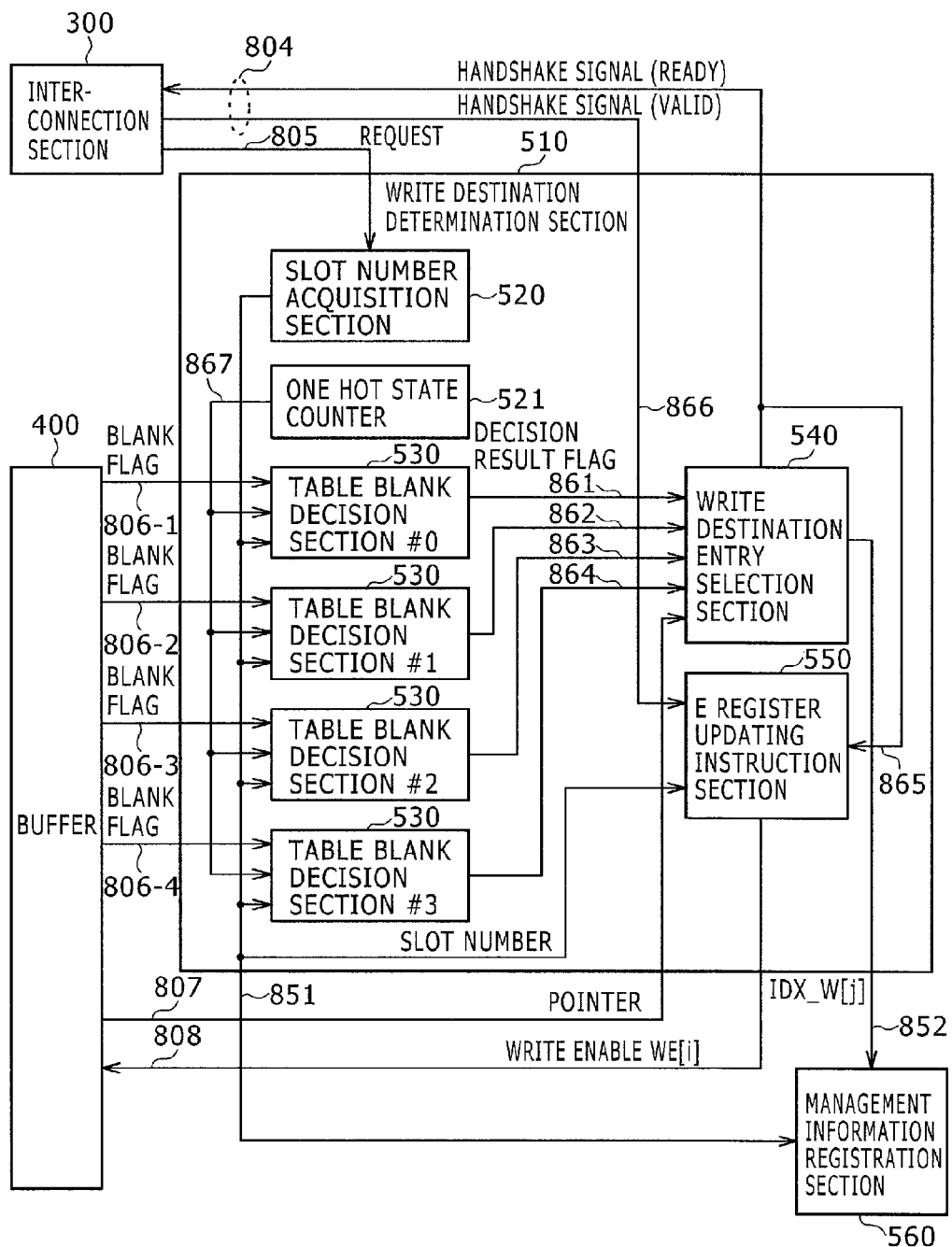
FIG. 18 is a block diagram showing an example of a configuration of a write destination determination section of the request processing section of FIG. 17.

FIG. 18 shows an example of a configuration of the write destination determination section 510 in the first embodiment of the present disclosure. Referring to FIG. 18, the write destination determination section 510 includes a slot number acquisition section 520, a one hot state counter 521, four table blank decision sections 530, a write destination entry selection section 540, and an E register updating instruction section 550. The table blank decision sections 530 are provided individually for the time slots and are individually referred to as table blank decision sections #0 to #3.

The slot number acquisition section 520 acquires a slot number of a time slot from a transaction identifier ID included in a request. The slot number acquisition section 520 notifies the table blank decision sections 530, E register updating instruction section 550 and management information registration section 560 of the acquired slot number through the signal line 851.

The one hot state counter 521 retains information of a bit number equal to the time slot number and counts, every time a time slot passes, the value to validate only the bit corresponding to the count value. Where four time slots are set, the one hot state counter 521 retains information of 4 bits individually corresponding to the time slots. Then, every time a time slot passes, the one hot state counter 521 counts the number and sets only the bit corresponding to the count value to "1" while it sets the other bits to "0." The one hot state counter 521 outputs current states of the retained information of 4 bits to the respective table blank decision sections 530 through a signal line 867.

The table blank decision sections 530 decide whether or not the entries in the management table corresponding to the received slot number include a blank entry. The table blank decision sections 530 receive a slot number from the slot number acquisition section 520 and a state from the one hot state counter 521. Each of the table blank decision section 530 decides whether or not the time slot indicated by the slot number and the time slot indicated by the state coincide with each other. If the two time slots coincide with each other, then the table blank decision section 530 decides that a request is issued in the time slot relating to the request, and accesses the buffer 400 to acquire a blank flag of the management table corresponding to the coincident time slot. The table blank decision section 530 decides based on the value of the blank flag whether or not the management table includes a blank entry. The table blank decision sections 530 outputs a result of the decision thereof regarding whether or not a blank entry exists to the write destination entry selection section 540 through the signal lines 861 to 864.

The write destination entry selection section 540 selects one of such blank entries. The write destination entry selection section 540 receives results of the decision from the table blank decision sections 530. If it is decided from all decision results that no blank entry is available, then the write destination entry selection section 540 negates a ready signal and outputs the negated ready signal to the interconnection section 300 and the E register updating instruction section 550. If at least one blank entry is available from any of the decision results, then the write destination entry selection section 540 asserts a ready signal and outputs the asserted ready signal to the interconnection section 300 and the E register updating instruction section 550. The ready signal to the E register updating instruction section 550 is outputted through a signal line 865. On the other hand, if more than one blank entry are available, then the write destination entry selection section 540 refers to the pointers to select one of the entries. For example, the write destination entry selection section 540 sets, for each pointer, a fixed priority degree which is set in a descending order in the list order of the pointers, in advance. The write destination entry selection section 540 selects, from among blank entries, an entry indicated by a pointer which exhibits the highest priority degree. Then, the write destination entry selection section 540 produces a write destination entry index IDX_W[j] based on the entry selection and notifies the management information registration section 560 of the write destination entry index IDX_W[j].

The E register updating instruction section 550 issues an instruction to update an E register. In particular, the E register updating instruction section 550 receives a slot number from the slot number acquisition section 520, a valid signal from the interconnection section 300 and a ready signal from the write destination entry selection section 540. If the valid signal and the ready signal are asserted, then the E register updating instruction section 550 produces a write enable signal WE[i] for the instruction to update the E register #i corresponding to the received slot number and outputs the write enable signal WE[i] to the buffer 400.

Figure 19:
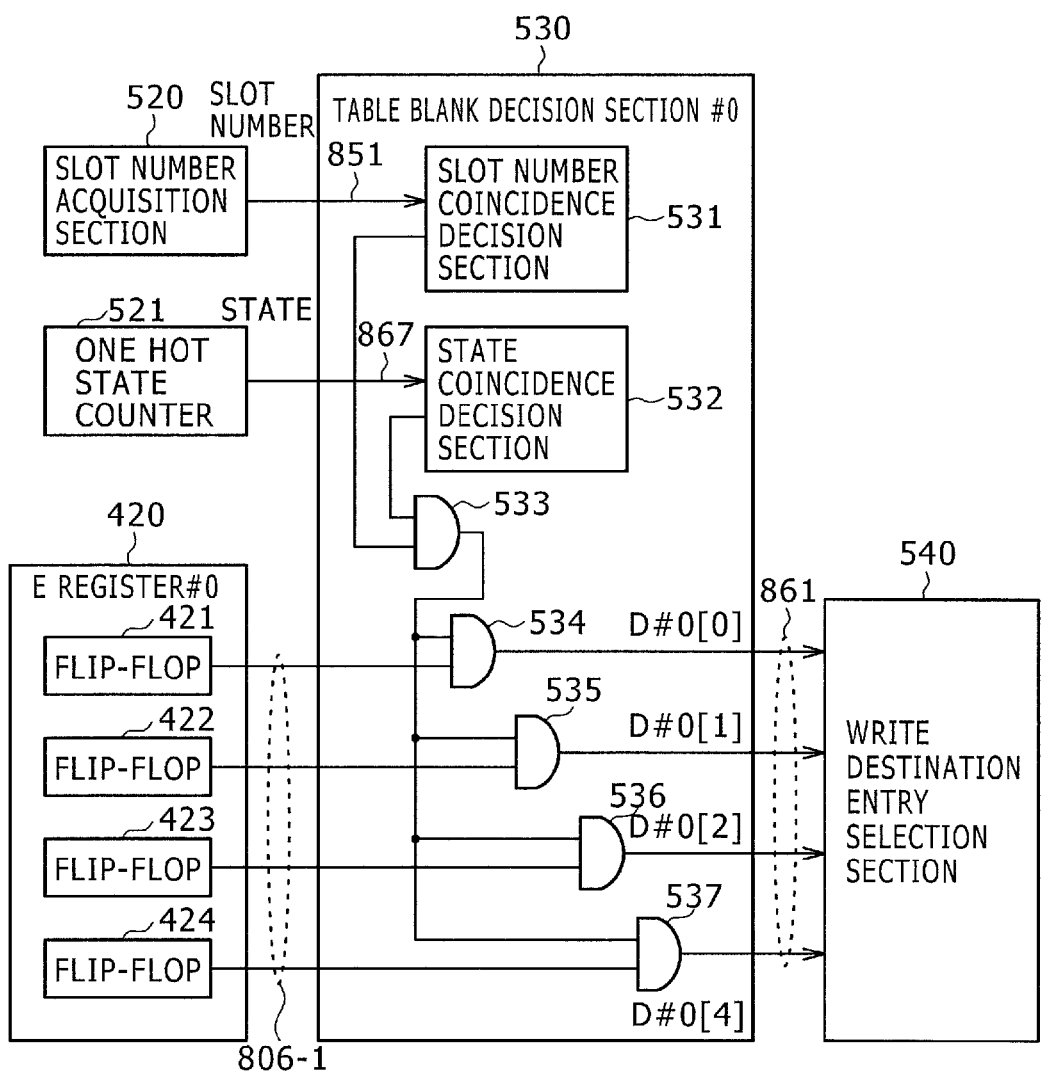
FIG. 19 is a block diagram showing an example of a configuration of a table blank decision section of the write destination determination section of FIG. 18.

FIG. 19 shows an example of a configuration of the table blank decision sections 530 in the first embodiment of the present disclosure. Referring to FIG. 19, the table blank decision sections 530 includes a slot number coincidence decision section 531, a state coincidence decision section 532, and AND gates 533 to 537.

The slot number coincidence decision section 531 decides whether or not a slot number coincides with a predetermined number. The numbers from "0" to "3" are allocated in advance to the table blank decision sections #0 to #3 corresponding to the management tables #0 to #3, respectively. The slot number coincidence decision section 531 receives a slot number from the slot number acquisition section 520 and decides whether or not the received slot number and the number allocated in advance coincide with each other. The slot number coincidence decision section 531 outputs a result of the decision to the AND gate 533. For example, if the decision result is coincidence, then the value "1" is placed, but if the decision result is incoincidence, then the value "0" is placed.

The state coincidence decision section 532 decides whether or not a state of the one hot state counter 521 and a predetermined state coincide with each other. States of "1000," "0100," "0010" and "0001" in binary notation are allocated in advance to the table blank decision sections #0 to #3 corresponding to the management tables #0 to #3, respectively. The state coincidence decision section 532 receives a state from the one hot state counter 521 and decides whether or not the received state and the state allocated in advance to the table blank decision sections 530 coincide with each other. The state coincidence decision section 532 outputs a result of the decision to the AND gate 533. For example, if coincidence is decided, then "1" is placed, but if incoincidence is decided, then "0" is placed.

The AND gates 533 to 537 output a logical AND value of input values. The AND gates 533 to 537 individually have two input terminals.

To one of the input terminals of the AND gate 533, a decision result from the slot number coincidence decision section 531 is inputted, and to the other input terminal of the AND gate 533, a decision result from the state coincidence decision section 532 is inputted. The AND gate 533 outputs a logical AND value of the input values to the AND gates 534 to 537.

To one of the input terminals of the AND gates 534 to 537, an output of the AND gate 533 is inputted, and to the other input terminal of the AND gates 534 to 537, a current value of the flip-flops of the E register corresponding to the management table is inputted. For example, in the table blank decision section 530 corresponding to the management table #0, current values of the flip-flops 421 to 424 of the register #0 are inputted. The AND gates 534 to 537 output logical AND values of the respective input values as decision result flags D#i[0] to D#i[3] to the write destination entry selection section 540, respectively.

The decision result flags D#i[0] to D#i[3] are information of 1 bit indicative of whether or not the entries #0 to #3 in the management table #i are blank when a request is issued in the time slot #i indicated by the slot specifying bit string included in the request.

FIG. 20 illustrates an example of action of the write destination entry selection section 540 in the first embodiment of the present disclosure. Referring to FIG. 20, the write destination entry selection section 540 receives decision result flags D#i[j] from the table blank decision sections 530. If all of the decision result flags D#i[j] are "0," then the write destination entry selection section 540 negates a ready signal and outputs the negated ready signal.

If any of the decision result flags D#i[j] is "1," then the write destination entry selection section 540 asserts a ready signal and outputs the asserted ready signal. Further, the write destination entry selection section 540 selects one of entries corresponding to the decision result flag D#i[j]=1 based on the pointer and produces a write destination entry index WE[j].

Figure 21:
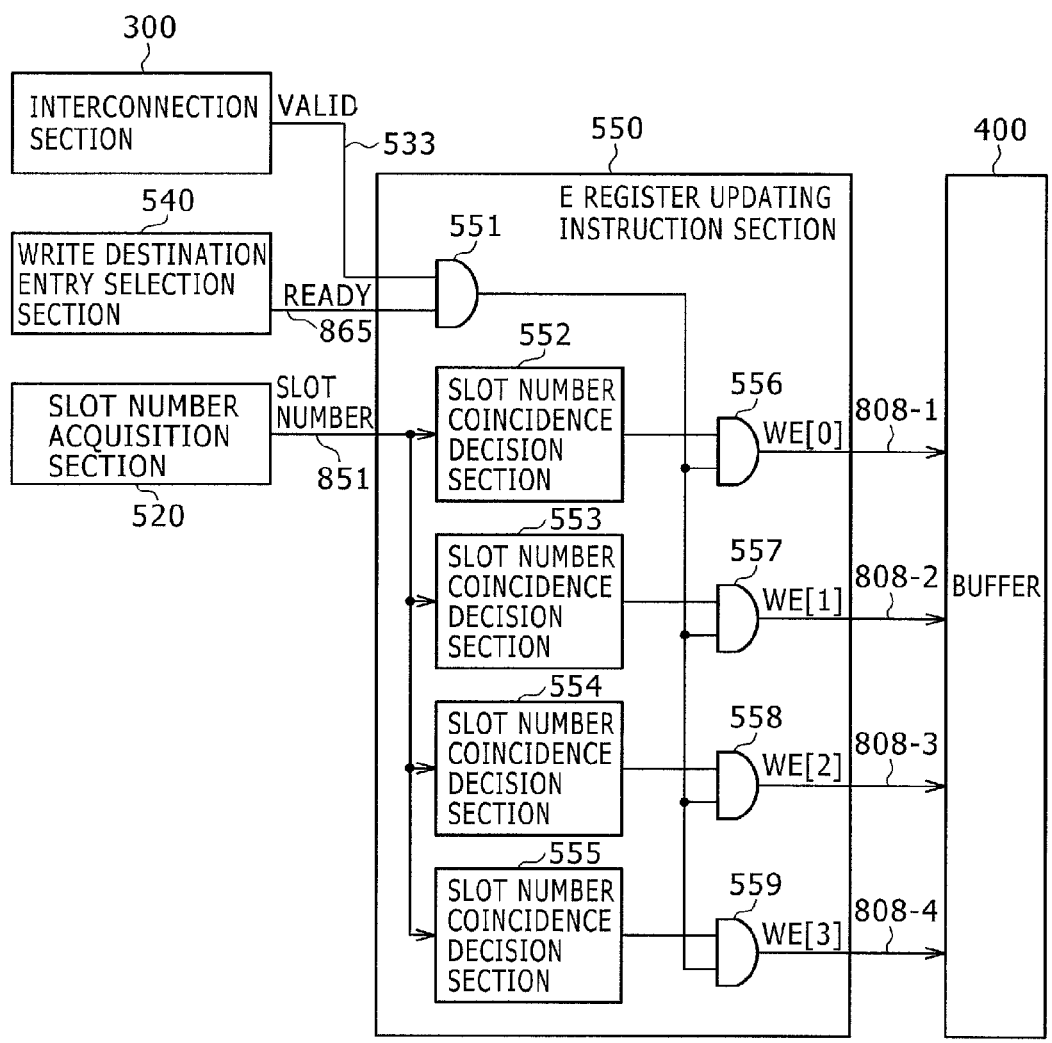
FIG. 21 is a block diagram showing an example of a configuration of an E register updating instruction section of the write destination determination section of FIG. 18.

FIG. 21 shows an example of a configuration of the E register updating instruction section 550 in the first embodiment of the present disclosure. Referring to FIG. 21, the E register updating instruction section 550 includes an AND gate 551, slot number coincidence decision sections 552 to 555, and AND gates 556 to 559.

The AND gates 551 and 556 to 559 output an AND value of input values and have two input terminals.

To one of the input terminals of the AND gate 551, a valid signal from the interconnection section 300 is inputted, and to the other input terminal of the AND gate 551, a ready signal from the write destination entry selection section 540 is inputted. The AND gate 551 outputs a logical AND value of the input values to the AND gates 556 to 559.

The slot number coincidence decision sections 552 to 555 decide whether or not a slot number coincides with a predetermined number. To the slot number coincidence decision sections 552 to 555, the numbers of "0" to "3" are allocated in advance, respectively. The slot number coincidence decision sections 552 to 555 receive a slot signal from the slot number acquisition section 520 and decide whether or not the received slot number and the number allocated in advance coincide with each other. The slot number coincidence decision sections 552 to 555 output respective decision results thereof to the AND gates 556 to 559, respectively. For example, to each decision result, "1" is placed when coincidence is decided, but "0" is placed when incoincidence is decided.

To one of the input terminals of the AND gates 556 to 559, an output of the AND gate 551 is inputted, and to the other input terminal of the AND gates 556 to 559, a decision result of the slot number coincidence decision sections 552 to 555 is inputted, respectively. The AND gates 556 to 559 output logical AND values of the input values as write enable signals WE[0] to WE[3] to the buffer 400 through the signal lines 808-1 to 808-4, respectively.

Figure 22:
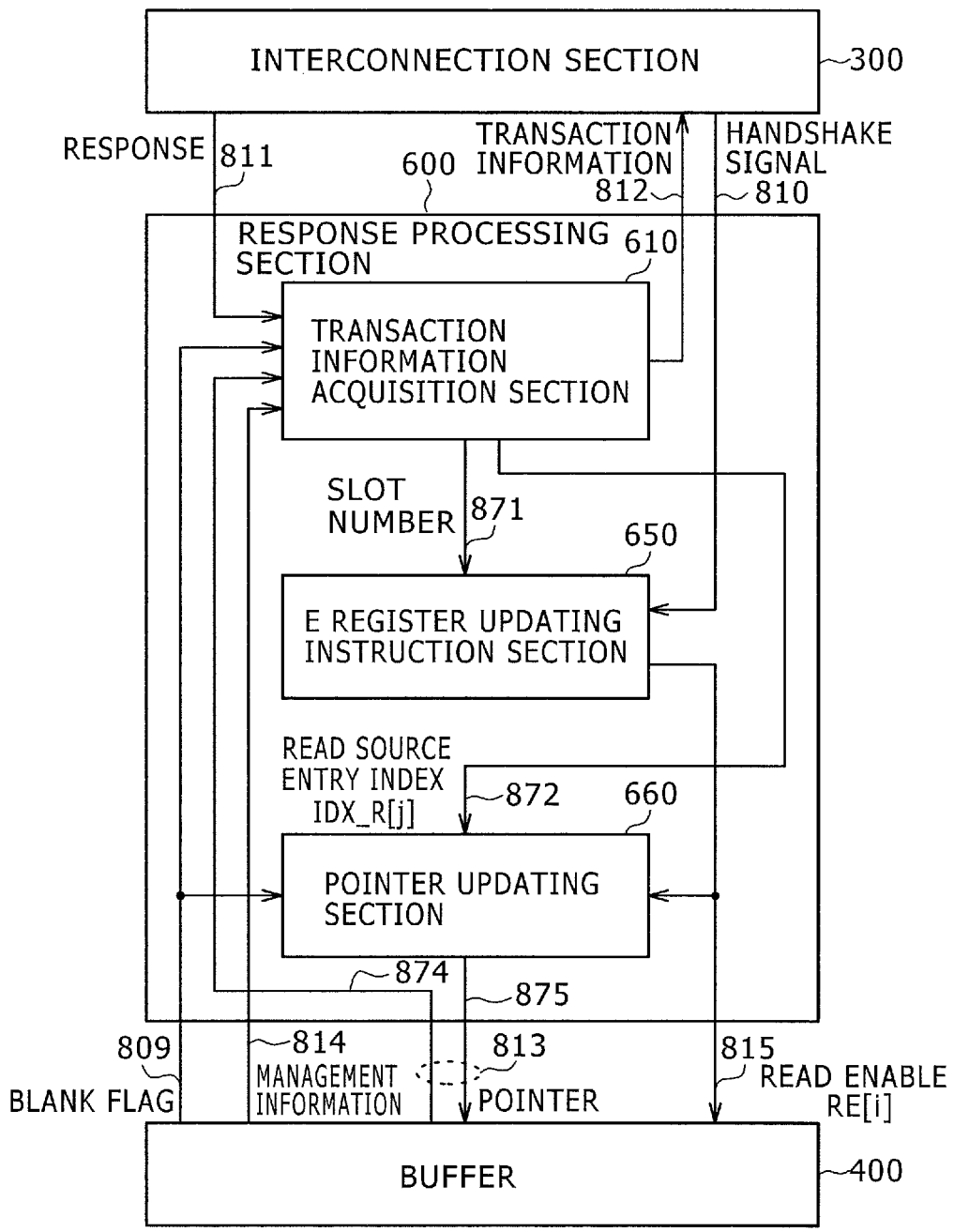
FIG. 22 is a block diagram showing an example of a configuration of a response processing section of the bus bridge of FIG. 7.

FIG. 22 shows an example of a configuration of the response processing section 600 in the first embodiment of the present disclosure. Referring to FIG. 22, the response processing section 600 includes a transaction information acquisition section 610, an E register updating instruction section 650, and a pointer updating section 660.

If a response is returned, then the transaction information acquisition section 610 reads out transaction information corresponding to the response from the buffer 400. When the response is received from the interconnection section 300, then the transaction information acquisition section 610 acquires a slot number and a uID from the transaction identifier ID of the response. The transaction information acquisition section 610 notifies the E register updating instruction section 650 of the slot number through a signal line 871.

The transaction information acquisition section 610 reads out a blank flag, management information and a pointer corresponding to the slot number from the buffer 400. The transaction information acquisition section 610 reads out transaction information corresponding to the uID relating to the request based on the blank flag, management information and pointer from the buffer 400. The transaction information acquisition section 610 outputs the read out transaction information to the interconnection section 300.

Then, the transaction information acquisition section 610 produces a read source entry index IDX_R[j] indicative of the entry from which the transaction information is read out. The transaction information acquisition section 610 outputs the read source entry index IDX_R[j] to the pointer updating section 660 through a signal line 872.

The read source entry index IDX_R[j] is a signal representative of the entry from which transaction information is read out. For example, where the number of entries in the management table is four, information of 4 bits formed from read source entry indexes IDX_RRE[0] to IDX_RRE[3] of 1 bit corresponding to each management table is generated. Then, only the bit corresponding to the entry from which the transaction information is read out is set to "1" while the other bits are set to "0."

The E register updating instruction section 650 issues an instruction to update an E register. The E register updating instruction section 650 receives a valid signal and a ready signal relating to the response from the interconnection section 300 and receives a slot number from the transaction information acquisition section 610. If the valid signal and the ready signal are asserted, then the E register updating instruction section 650 produces a read enable signal RE[i] for the instruction to update the E register #i corresponding to the received slot number and outputs the read enable signal RE[i] to the buffer 400 and the pointer updating section 660.

The read enable signal RE[i] is a signal for the instruction to update a blank flag corresponding to some management table. For example, where the number of management tables is four, information of 4 bits formed from read enable signals RE[0] to RE[3] of 1 bit is produced. Then, only the bit corresponding to the management table to which the specified slot number is allocated is set to "1" while the other bits are set to "0".

The pointer updating section 660 updates, based on updating of the E register #i, the corresponding pointer table #i. In particular, the pointer updating section 660 receives the read enable signal RE[i] from the E register updating instruction section 650. The pointer updating section 660 updates the pointers such that, in the management table corresponding to the read enable signal RE[i], entries in which valid management information is retained are arrayed successively from the top.

Figure 23:
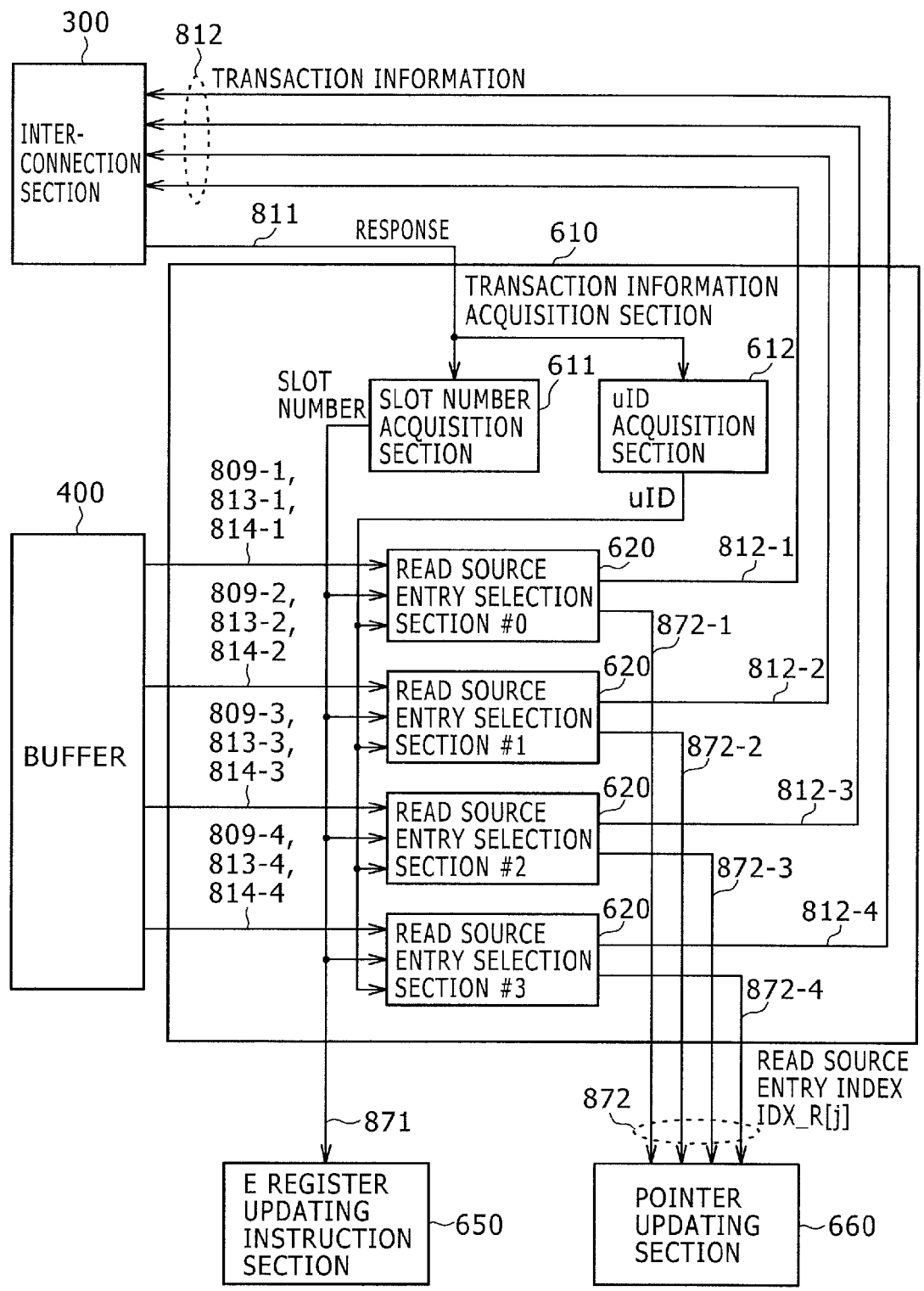
FIG. 23 is a block diagram showing an example of a configuration of a transaction information acquisition section of the response processing section of FIG. 22.

FIG. 23 shows an example of a configuration of the transaction information acquisition section 610 in the first embodiment of the present disclosure. Referring to FIG. 23, the transaction information acquisition section 610 includes a slot number acquisition section 611, a uID acquisition section 612, and four read source entry selection sections 620.

The slot number acquisition section 611 acquires the slot number of a time slot from the transaction identifier ID relating to a response. The slot number acquisition section 611 notifies the read source entry selection sections 620 and the E register updating instruction section 650 of the acquired slot number.

The uID acquisition section 612 acquires a uID from the transaction identifier ID relating to the response. The uID acquisition section 612 notifies the read source entry selection sections 620 of the acquired uID.

The read source entry selection sections 620 selects an entry in which transaction information corresponding to the response is placed and reads out the transaction information of the entry. The read source entry selection sections 620 outputs the read out transaction information to the interconnection section 300 and a read source entry index IDX_R[j] indicative of the read out entry to the pointer updating section 660.

Figure 24:
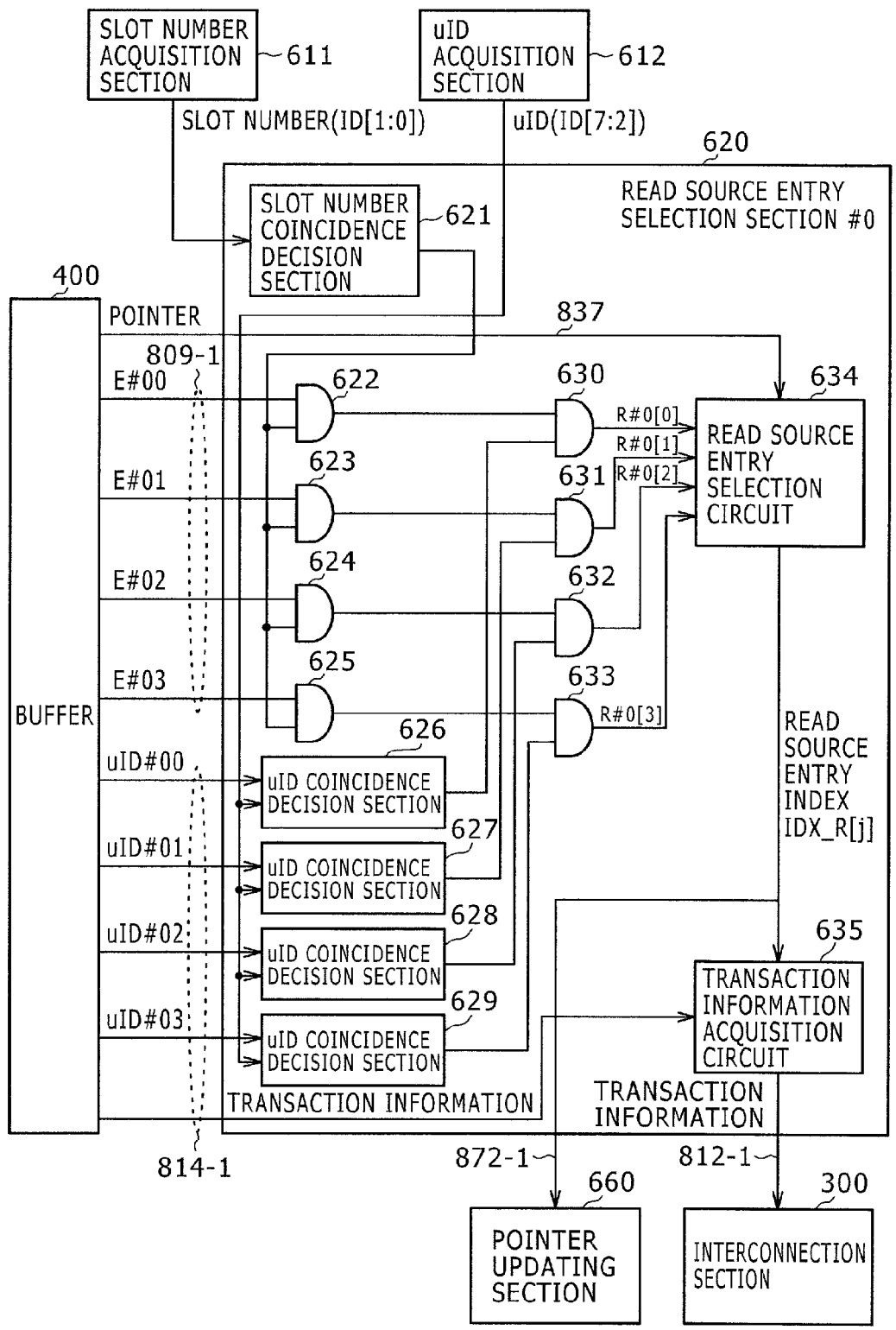
FIG. 24 is a block diagram showing an example of a configuration of a read source entry selection section of the transaction information acquisition section of FIG. 23.

FIG. 24 shows an example of a configuration of the read source entry selection sections 620 in the first embodiment of the present disclosure. Referring to FIG. 24, each read source entry selection section 620 includes a slot number coincidence decision section 621, AND gates 622 to 625, uID coincidence decision sections 626 to 629, and AND gates 630 to 633. The read source entry selection section 620 further includes a read source entry selection circuit 634 and a transaction information acquisition circuit 635.

The slot number coincidence decision section 621 decides whether or not a slot number coincides with a predetermined number. To the read source entry selection sections 620 corresponding to the management tables #0 to #3, the numbers from "0" to "3" are allocated in advance, respectively. The slot number coincidence decision section 621 receives a slot number from the slot number acquisition section 611 and decides whether or not the received slot number and the number allocated thereto in advance coincide with each other. The slot number coincidence decision section 621 outputs a result of the decision to the AND gates 622 to 625. For example, if the decision result indicates coincidence, then the value "1" is placed, but if the decision result indicates incoincidence, then the value "0" is placed.

The AND gates 622 to 625 and 630 to 633 output a logical AND value of input values thereto. The AND gates 622 to 625 and 630 to 633 have two input terminals.

To one of the input terminals of the AND gates 622 to 625, a decision result of the slot number coincidence decision section 621 is inputted, and to the other input terminal of the AND gates 622 to 625, the values of blank flags retained in the flip-flops of the corresponding management table are inputted. The AND gates 622 to 625 output logical AND values of the input values to the AND gates 630 to 633, respectively.

The uID coincidence decision sections 626 to 629 decide whether or not the uID relating to a request coincides with the uID retained in the entries thereof. The uID coincidence decision sections 626 to 629 receive a uID from the uID acquisition section 612 and decide whether or not the received uID coincides with the uID retained in the entries thereof. The uID coincidence decision sections 626 to 629 output a result of the decision to the AND gates 630 to 633, respectively. For example, if the decision result indicates coincidence, then the value "1" is placed, but if the decision result indicates incoincidence, then the value "0" is placed.

To one of the input terminals of the AND gates 630 to 633, an output of the AND gates 622 to 625 is inputted, and to the other input terminal of the AND gates 630 to 633, a decision result of the uID coincidence decision sections 626 to 629 is inputted, respectively. The AND gates 630 to 633 output a logical AND value of the input values as decision result flags R#i[0] to R#i[3] to the read source entry selection circuit 634, respectively.

The decision result flags R#i[0] to R#i[3] are signals indicative of whether or not transaction information corresponding to a response is stored in the entries of the management table #i. In the management table #i corresponding to a slot number relating to a response, if a uID relating to the response is retained in the entry #j, "1" is placed into the decision result flag R#i[j]. In any other case, "0" is placed into the decision result flag R#i[j].

Here, in the AXI protocol, as described above, when a master issues a transaction, if the master requests a slave to maintain an order relationship, then it is permitted to apply the same transaction identifier ID as described hereinabove. Therefore, if a plurality of transactions of the same transaction identifier ID are issued, then it is supposed that "1" may be placed in two or more decision result flags R#i[j].

The read source entry selection circuit 634 selects an entry from which transaction information is to be read out. The read source entry selection circuit 634 receives a decision result flag R#i[j] from the AND gates 630 to 633. The read source entry selection circuit 634 selects one of entries corresponding to the decision result flag R#i[j]=1. For example, the read source entry selection circuit 634 sets a fixed priority degree for each pointer in advance and selects that one of the entries corresponding to the decision result flag R#i[j]=1 which indicates the highest priority degree. The read source entry selection circuit 634 produces a read source entry index IDX_R[j] indicative of the selected entry and outputs the read source entry index IDX_R[j] to the transaction information acquisition circuit 635 and the pointer updating section 660.

The transaction information acquisition circuit 635 receives the read source entry index IDX_R[j] from the read source entry selection circuit 634. The transaction information acquisition circuit 635 accesses the buffer 400 to read out transaction information from an entry indicated by the read source entry index IDX_R[j] and outputs the read out transaction information to the interconnection section 300.

Figure 25:
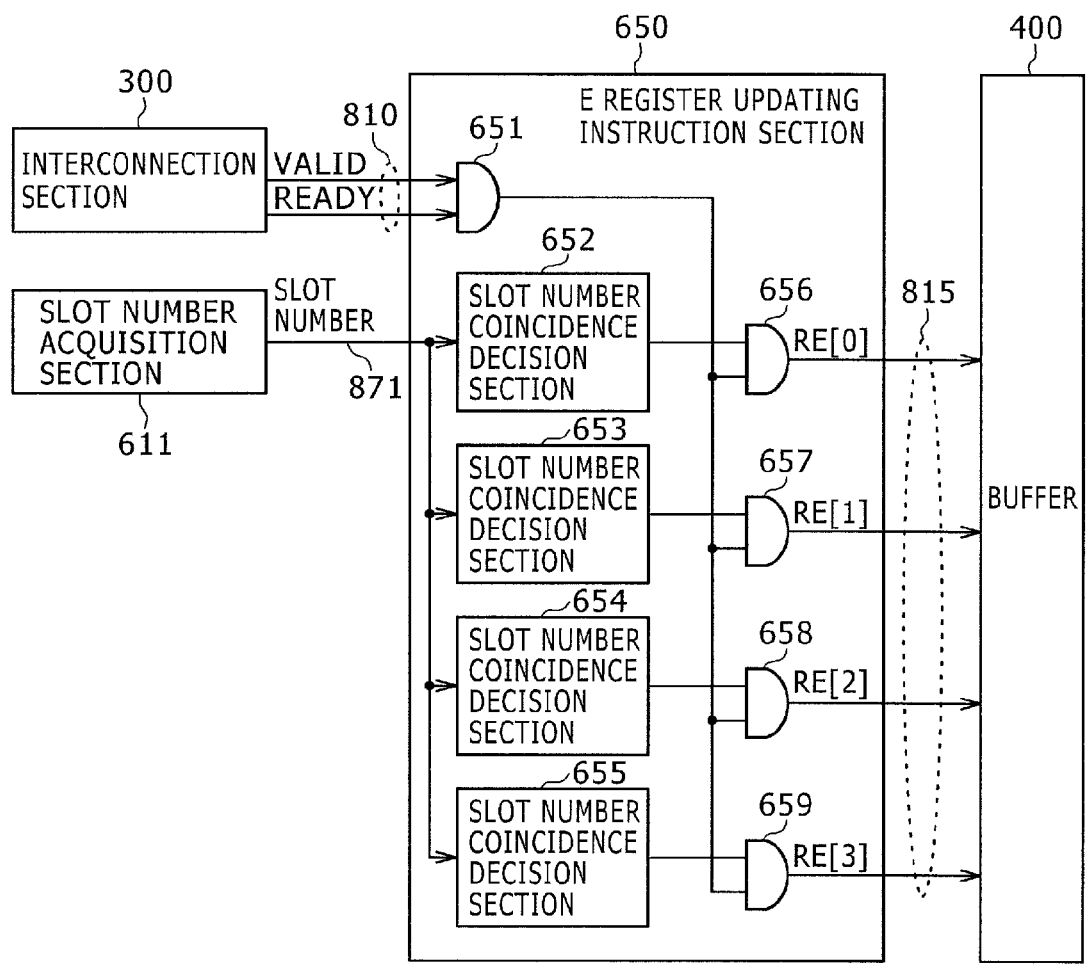
FIG. 25 is a block diagram showing an example of a configuration of an E register updating instruction section of the response processing section of FIG. 22.

FIG. 25 shows an example of a configuration of the E register updating instruction section 650 in the first embodiment of the present disclosure. Referring to FIG. 25, the E register updating instruction section 650 includes an AND gate 651, slot number coincidence decision sections 652 to 655, and AND gates 656 to 659.

The AND gates 651 and 656 to 659 output a logical AND value of input values. The AND gates 651 and 656 to 659 has two input terminals.

To the input terminals of the AND gate 651, a valid signal and a ready signal from the interconnection section 300 are inputted. The AND gate 651 outputs a logical AND value of the input values to the AND gates 656 to 659.

The slot number coincidence decision sections 652 to 655 decide whether or not a slot number coincides with a predetermined number. The slot number coincidence decision sections 652 to 655 have numbers "0" to "3" allocated thereto in advance, respectively. The slot number coincidence decision sections 652 to 655 receive a slot number from the slot number acquisition section 611 and decide whether or not the received slot number and the number allocated thereto in advance coincide with each other. The slot number coincidence decision sections 652 to 655 output a result of the decision to the AND gates 656 to 659, respectively. For example, if the decision result indicates coincidence, then the value "1" is placed, but if the decision result indicates incoincidence, then the value "0" is placed.

To one of the input terminals of the AND gates 656 to 659, an output from the AND gate 651 is inputted, and to the other input terminal of the AND gates 656 to 659, a decision result of the slot number coincidence decision sections 652 to 655 is inputted, respectively. The AND gates 656 to 659 output a logical AND value of the input values as read enable signals RE[0] to RE[3] to the buffer 400, respectively.

Action of the Bus Bridge

Figure 26:
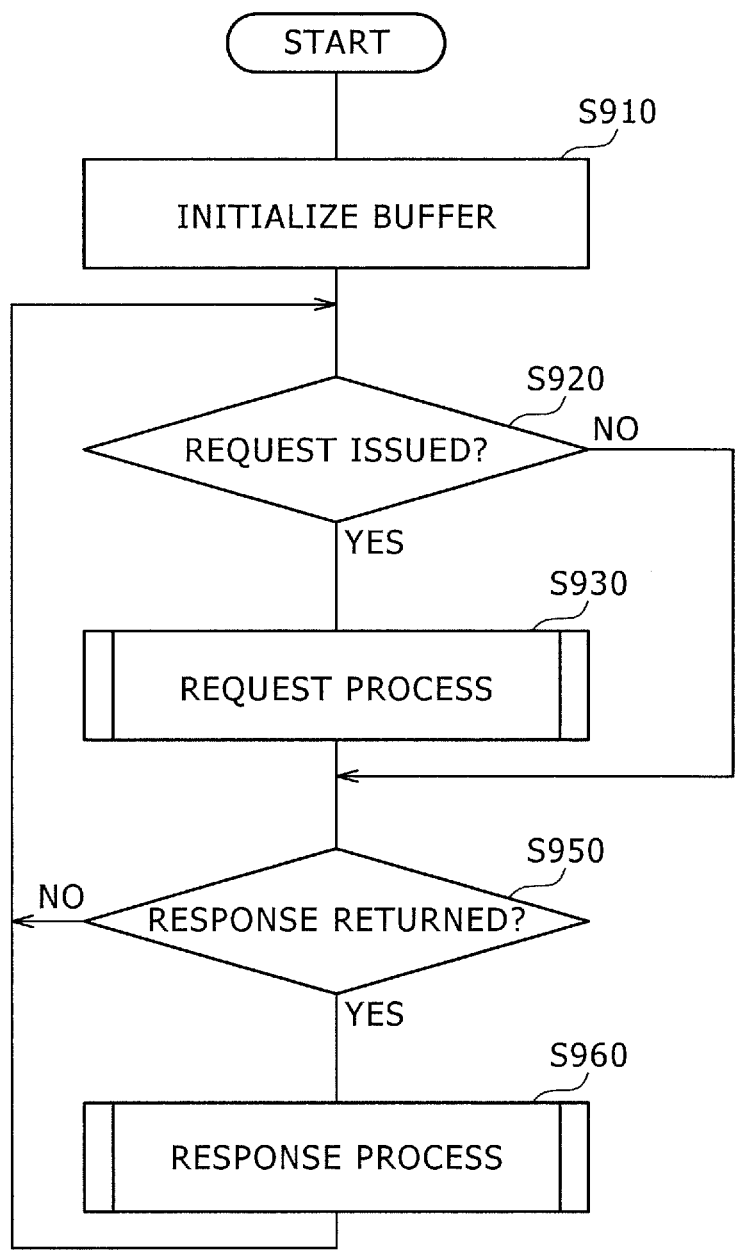
FIG. 26 is a flow chart illustrating action of the bus bridge of FIG. 7.

Action of the bus bridge 200 is described with reference to FIGS. 26 to 28. FIG. 26 is a flowchart illustrating an example of action of the bus bridge 200 in the first embodiment of the present disclosure. This action is started when the power supply to the bus bridge 200 is made available, when the buffer 400 is initialized and so forth.

The interconnection section 300 first initializes the buffer 400 at step S910. Upon the initialization, for example, the bus bridge 200 sets all blank flags to "1" to invalidate all management information. Further, for example, the bus bridge 200 sets the value of the pointers in the management tables to "00," "01," "10" and "11" in order from the top.

The bus bridge 200 decides whether or not a request is issued from a master at step S920. If a request is issued (Yes at step S920), then the request processing section 500 in the bus bridge 200 executes a request process for retaining the management information at step S930.

If no request is issued (No at step S920) or after step S950, the bus bridge 200 decides at step S950 whether or not a response is sent back from the slave. If a response is sent back (Yes at step S950), then the response processing section 600 in the bus bridge 200 executes, at step S960, a response process for reading out transaction information corresponding to the response.

If no response is sent back (No at step S950) or after step S960, the bus bridge 200 returns the processing to step S920.

Figure 27:
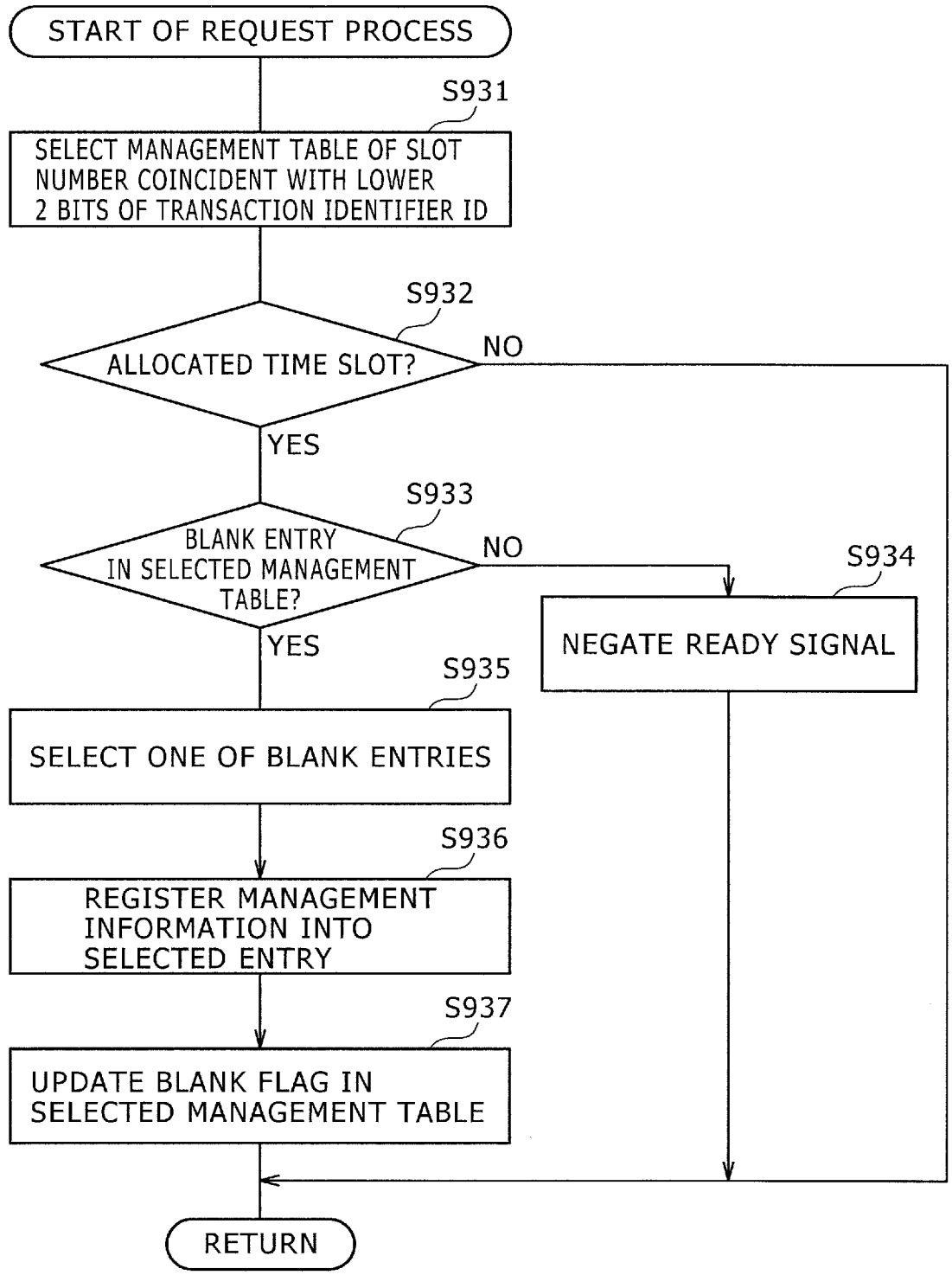
FIG. 27 is a flow chart illustrating an example of a request process illustrated in FIG. 26.

FIG. 27 is a flowchart illustrating an example of the request process at step S930 of FIG. 26. Referring to FIG. 27, the request processing section 500 selects, first at step S931, a management table of a slot number which coincides with lower 2 bits of the transaction identifier ID. Then at step S932, the response processing section 600 decides whether or not a time slot indicated by a slot number relating to the request is a time slot allocated to the bus bridge 200.

If the time slot is allocated to the bus bridge 200 (Yes at step S932), then the request processing section 500 decides at step S933 whether or not the selected management table has some blank. If the management table does not have a blank (No at step S933), then the request processing section 500 negates the ready signal at step S934.

On the other hand, if the management table has some blank (Yes at step S933), then the request processing section 500 asserts the ready signal and selects a blank entry of the management table at step S935. The request processing section 500 registers the management information into the selected entry at step S936. Then, the request processing section 500 updates the blank flag corresponding to the selected management table into the buffer 400 at step S937.

If the time slot indicated by the slot number is not allocated time slot (No at step S932), or after step S934 or step S937, the request processing section 500 ends the request process.

Figure 28:
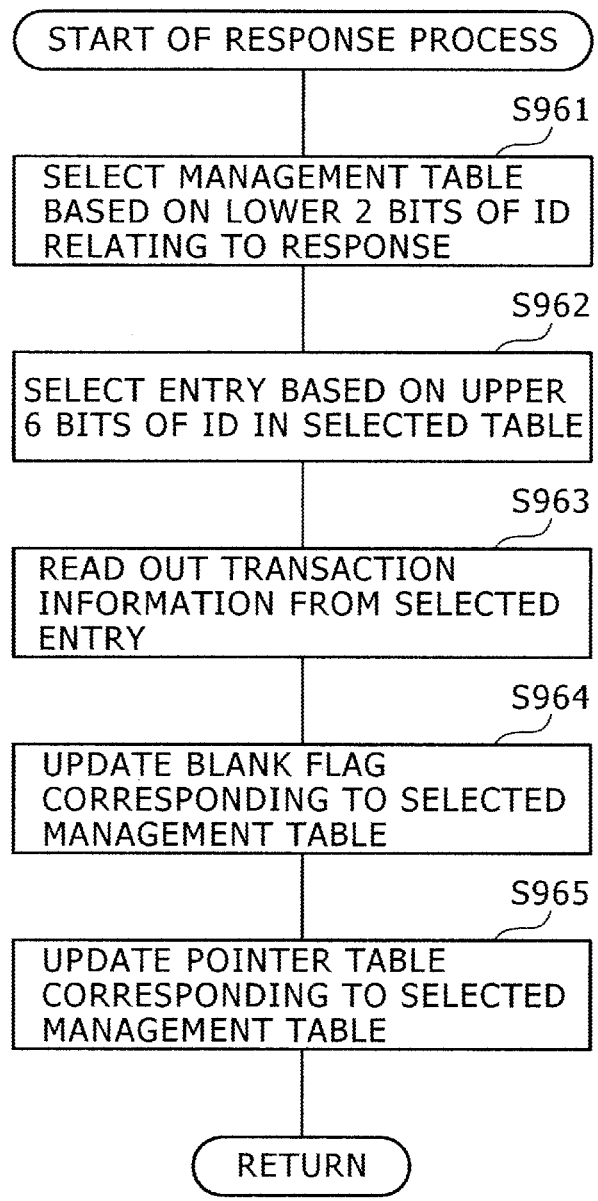
FIG. 28 is a flow chart illustrating an example of a response process illustrated in FIG. 26.

FIG. 28 is a flowchart illustrating an example of the response process at step S960 of FIG. 26. Referring to FIG. 28, the response processing section 600 selects a management table based on lower 2 bits of the transaction identifier ID relating to the response at step S961. Then at step S962, the response processing section 600 selects one of entries in the selected management table based on upper 6 bits of the transaction identifier ID. Then at step S963, the response processing section 600 reads out transaction information from the selected entry.

The response processing section 600 causes the buffer 400 to update the blank flag corresponding to the selected management table at step S964. Then at step S965, the response processing section 600 updates the pointer table corresponding to the selected management table. After step S965, the response processing section 600 ends the response process.

Figure 29:
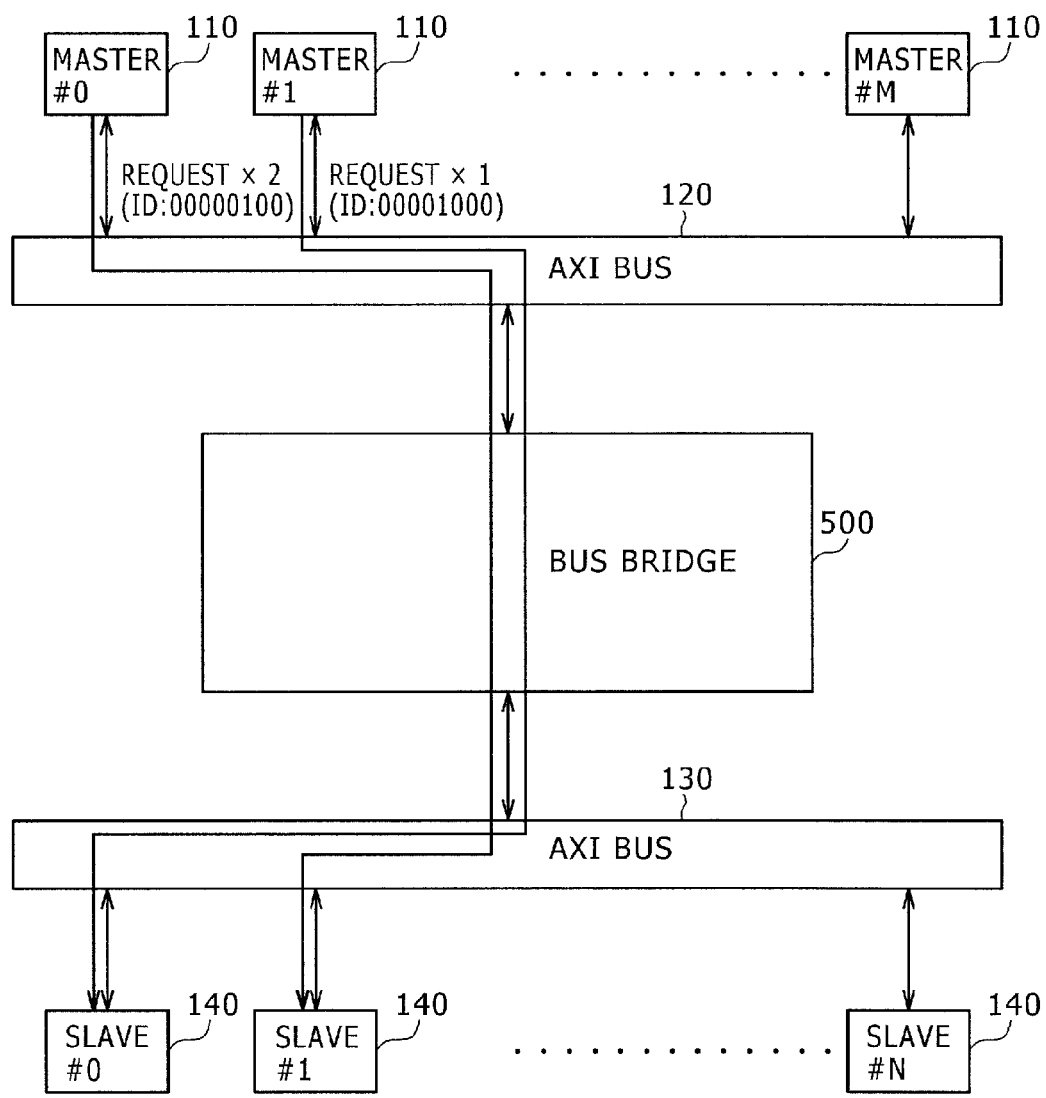
FIG. 29 is a block diagram illustrating an example of a transfer process of a request in the bus system of FIG. 1.

Now, an example of a result of action of the bus bridge 200 in the first embodiment is described with reference to FIGS. 29 to 32. Referring first to FIG. 29, it is assumed that a request is issued twice from the master #0 to the slave #1 and then a request is issued once from the master #1 to the slave #0. It is assumed that the master #0 issues the request setting the value of the transaction identifier ID to "00000100" in binary notation. Meanwhile, it is assumed that the master #1 issues the request setting the value of the transaction identifier ID to "00001000." Those requests are issued in a time slot corresponding to the lower 2 bits "00" of the transaction identifier ID. Further, at a point of time at which the bus bridge 200 receives the first request, the buffer 400 is in an initialized state.

Figure 30:
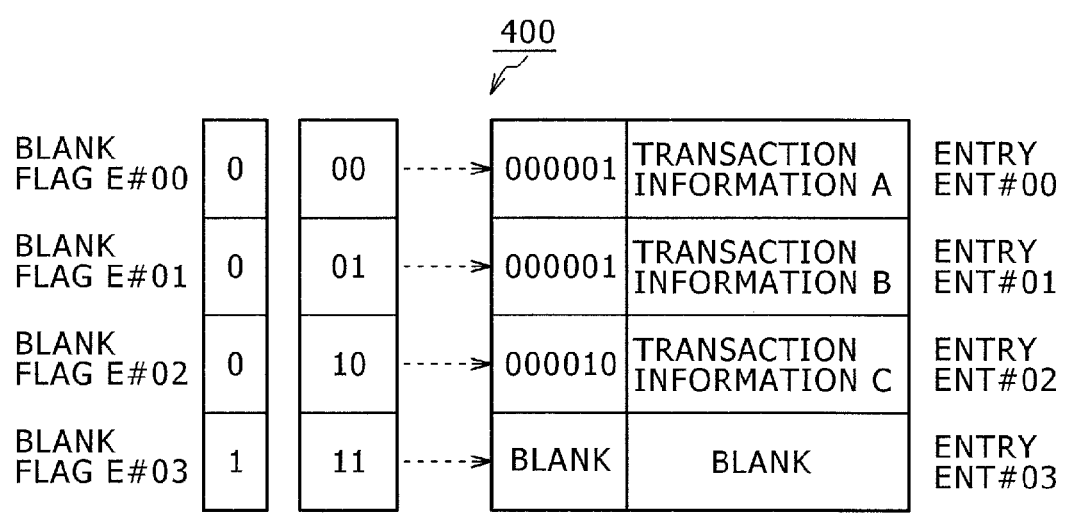
FIG. 30 is a view illustrating an example of information retained in the buffer of FIG. 10 based on a request.

Since the lower 2 bits of the transaction identifier ID in the requests are "00," the request processing section 500 selects the management table #0. The request processing section 500 retains management information relating to the requests issued twice from the master #0 and the request issued once from the master #1 in the order of the entries ENT#00, ENT#01 and ENT#02 based on the list order of the pointers. FIG. 30 illustrates an example of the buffer 400 in which the management information mentioned is retained. Referring to FIG. 30, the upper 6 bits "000001" of the transaction identifier ID issued twice by the master #0 are retained in the entries ENT#00 and ENT#01 together with the transaction information. Further, the upper 6 bits "000010" of the transaction identifier ID issued once by the master #1 are retained in the entry ENT#02 together with the transaction information.

Figure 31:
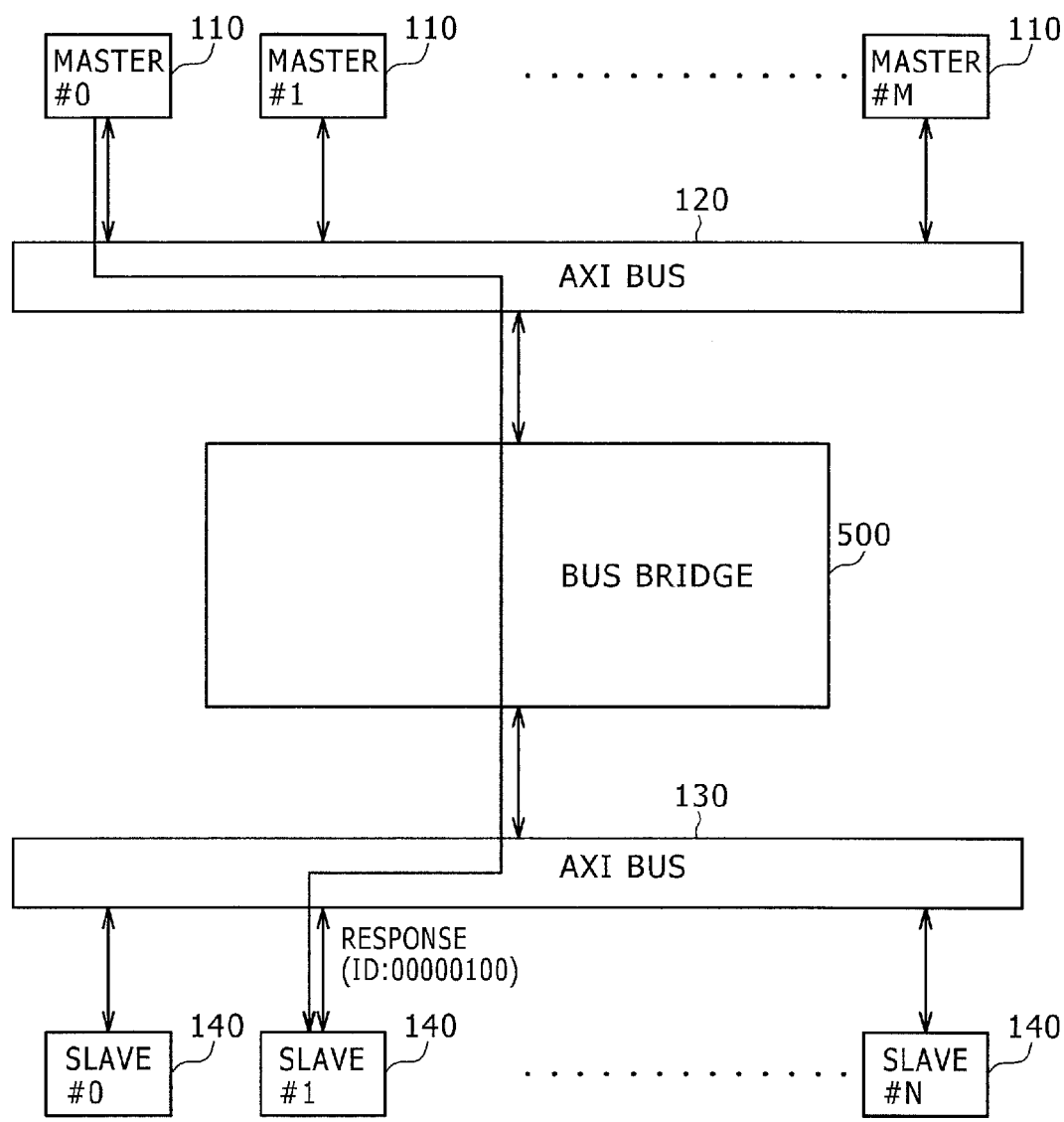
FIG. 31 is a block diagram illustrating an example of a transfer process of a response in the bus system of FIG. 1.
Figure 32:
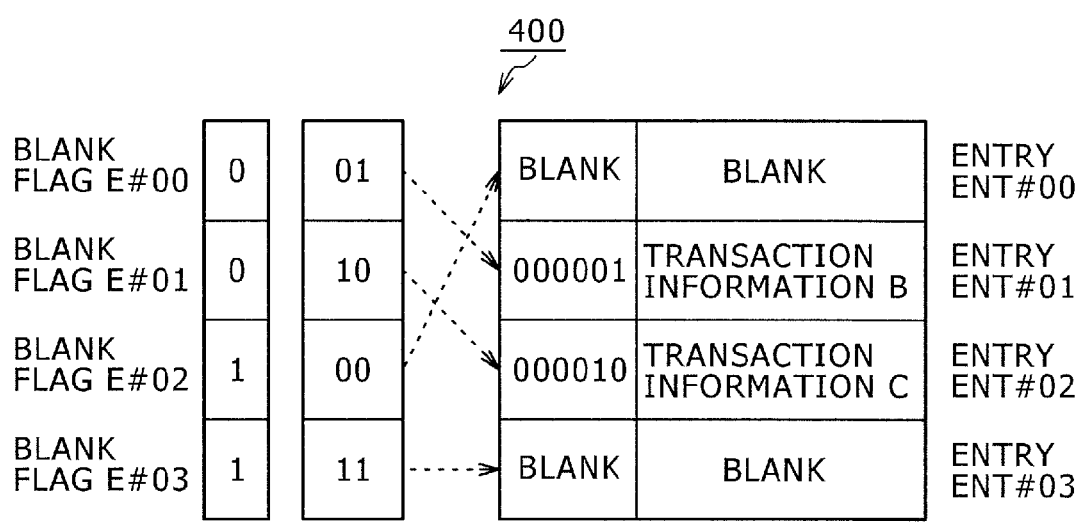
FIG. 32 is a view illustrating an example of information retained in the buffer of FIG. 10 based on a response.

It is assumed that, after the management information is retained, a response is sent back from the slave #1 to the master #0 as seen in FIG. 31. Referring to FIG. 31, since this response corresponds to the request issued from the master #0, the slave #1 issues "00000100" same as the transaction identifier ID relating to the request issued from the master #0.

The response processing section 600 selects the management table #0 from the lower 2 bits "00" of the transaction identifier ID relating to the response. Then, the response processing section 600 acquires the entries ENT#00 and ENT#01 in which the transaction information corresponding to the upper 6 bits "000001" of the transaction identifier ID relating to the response is retained. The response processing section 600 selects the entry ENT#00 based on the list order of the pointers and reads out the transaction information from the entry ENT#00. As a result, the entry ENT#00 is placed into a blank state. The response processing section 600 updates the pointer table such that entries in which valid management information is retained are filled from the top. In this instance, the pointer table is updated such that the entries ENT#01 and ENT#02 are filled to the top while the entry ENT#00 having placed into a blank state is arrayed next to the entries. As a result, the pointers are updated to "01," "10," "00" and "11" in order from the top.

It is to be noted that, while the bus system of the first embodiment uses the AXI protocol, naturally any other protocol may be used if it permits split transactions.

Further, while FIG. 1 shows the configuration wherein the masters 110 are connected to the AXI bus 120 and the slaves 140 are connected to the AXI bus 130, the connection scheme of the modules is not limited to the configuration shown in FIG. 1. For example, slaves may be connected to the AXI bus 120 in addition to the masters or the masters may be connected to the AXI bus 130 in addition to the slaves.

Further, while the lower 2 bits of the transaction identifier ID are used as slot specifying bits, naturally any other portion of the transaction identifier ID than the lower 2 bits may be used as the slot specifying bits.

Further, FIG. 8 shows the configuration wherein a burst length, a burst size and so forth are retained as transaction information. However, the management table may retain information different from the information illustrated in FIG. 8 as transaction information if it is information necessary for transfer control of a response.

Further, the request processing section 500 and the response processing section 600 refer to pointers to specify a retaining order of management information. However, any information other than the pointers may be used if it can specify a retaining order of management information.

In this manner, with the first embodiment of the present disclosure, the request processing section 500 decides whether or not a time slot specified from a slot specifying bit string relating to a request is a time slot allocated to the bus bridge 200. If the specified time slot is the allocated time slot, then the response processing section 600 retains a partial bit string relating to the request in an associated relationship with transaction information into a management table corresponding to the time slot. In this configuration, as the total capacity of the management tables, only a capacity for retaining a number of pieces of management information equal to a maximum number such as, for example, 16, to the number of unsettled transfers permitted by the bus system is required. Therefore, even if the maximum number to the transaction number permitted by the bus system increases, it is possible to cope with this only by increasing the width of the partial bit string of management information or the number of management tables as occasion demands.

For example, if the maximum value of the transaction number to be permitted is increased from 256 to 512, it is possible to cope with this only by increasing the width of the partial bit string from 6 bits to 7 bits. Or it is possible to cope with this by providing nine management tables whose entry number is 2. When the number of management tables is to be increased, since only it is necessary for the total number of entries of the management tables to be greater than a maximum number such as, for example, 16 to the number of unsettled transactions, the number of entries of each management table can be reduced. Accordingly, increase of the size of the buffer 400, that is, the storage capacity of the buffer 400, can be suppressed.

Further, since management information is retained in a plurality of management tables individually corresponding to time slots, each management table may retain not the entire transaction identifier ID but the partial bit string of the same. Therefore, the capacity of the buffer 400 can be reduced from that in an alternative case in which only one management table is provided.

Further, the request processing section 500 retains management information in the case where a request is issued in a time slot. Therefore, it is possible to retain a large number of pieces of management information dispersedly in the individual management tables and consequently prevent management information from being concentrated on some of the management tables.

Further, the bus bridge 200 specifies a retaining order of management information from pointers and retains the management information in accordance with the retaining order. Therefore, the bus bridge 200 can read out the transaction information in accordance with the issuance order of requests.

2. Second Embodiment

Configuration of the Bus System

Figure 33:
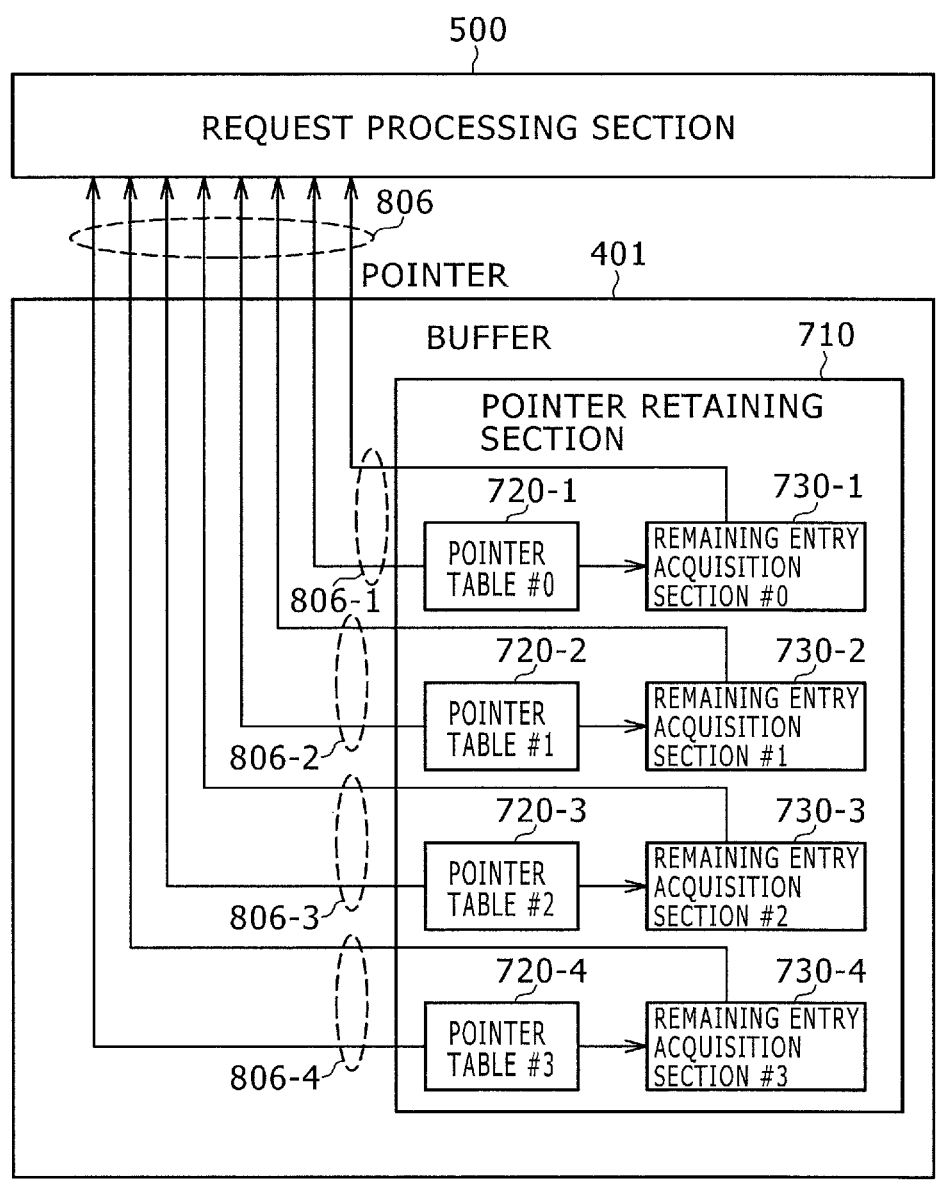
FIG. 33 is a block diagram showing an example of a configuration of a buffer in a second embodiment of the present disclosure.

Now, a bus bridge of a second embodiment of the present disclosure is described with reference to FIGS. 33 to 35. The bus bridge of the second embodiment of the present disclosure is different from the bus bridge of the first embodiment of the present disclosure in that the capacity of a pointer table is reduced. In the following, only differences of the second embodiment of the present disclosure from the first embodiment of the present disclosure are described while description of similar configurations of the second embodiment to those of the first embodiment is omitted herein to avoid redundancy. Referring first to FIG. 33, there is shown an example of a configuration of a buffer 401 in the second embodiment of the present disclosure. In FIG. 33, the E register updating section 410, blank flag retaining section 420, management information retaining section 440 and response processing section 600 are not shown. The buffer 401 is similar to the buffer 400 in the first embodiment except that it includes a pointer retaining section 710 in place of the pointer retaining section 430. The pointer retaining section 710 includes pointer tables 720-1 to 720-4 and remaining entry acquisition sections 730-1 to 730-4.

The pointer tables 720-1 to 720-4 retain a plurality of pointers. The remaining entry acquisition sections 730-1 to 730-4 acquire those of entries of a management table which are not entries indicated by pointers corresponding to the management table. The request processing section 500 refers to the entries indicated by the pointers of the pointer table and the entries acquired by the remaining entry acquisition sections 730-1 to 730-4 though the signal line 806. The response processing section 600 which is omitted in FIG. 33 is also refers to the entries indicated by the pointers of the pointer table and the entries acquired by the remaining entry acquisition sections. The request processing section 500 and the response processing section 600 can access all entries of the management table by referring to the pointers and the entries. Therefore, the pointer table need not retain a number of pointers equal to the number of entries any more. Therefore, in the second embodiment, the pointer tables 720-1 to 720-4 are configured such that they retain only a number of pointers smaller by one than the number of entries in the corresponding management table.

Figure 34:
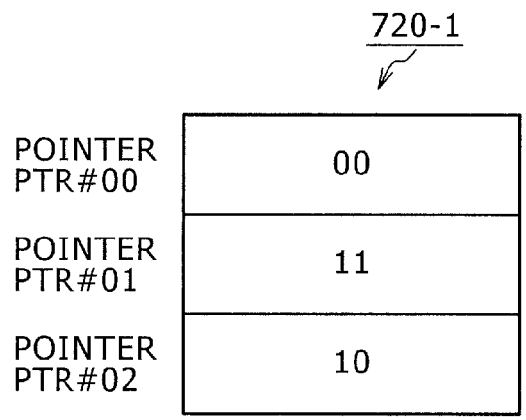
FIG. 34 is a view showing an example of a configuration of a pointer table in the second embodiment of the present disclosure.

FIG. 34 shows an example of a configuration of the pointer table 720-1 in the second embodiment of the present disclosure. Referring to FIG. 34, the pointer table 720-1 retains three pointers PTR#00 to PTR#02. The configuration of the pointer tables 720-2 to 720-4 is similar to that of the pointer table 720-1.

Here, it is assumed that the maximum value of the number of unsettled transactions permitted by the bus system of the second embodiment is 16 similarly as in the first embodiment. In this instance, each of the four management tables includes four entries similarly as in the first embodiment. Accordingly, in the first embodiment, each pointer table needs to retain four pointers as illustrated in FIG. 15. In contrast, in the second embodiment, each of the pointer tables 720-1 to 720-4 has only three pointers. This is because the remaining entry acquisition sections 730-1 to 730-4 acquire the remaining entries.

Figure 35:
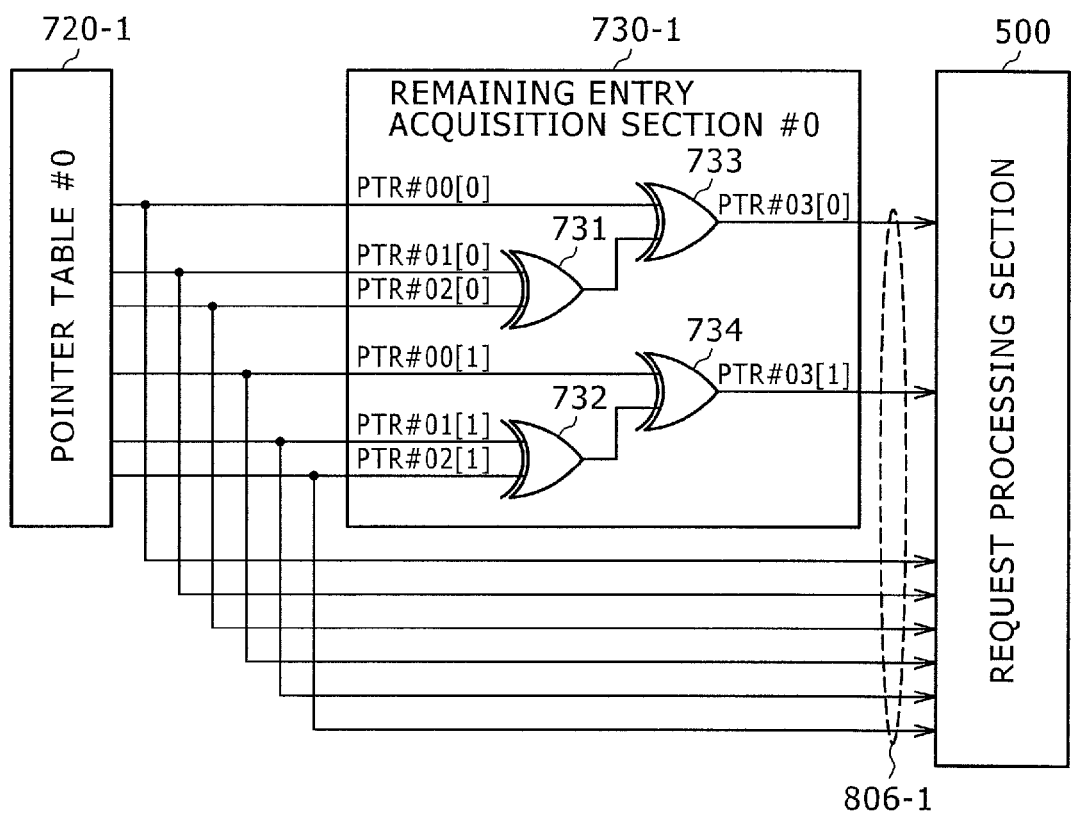
FIG. 35 is a block diagram showing an example of a configuration of a remaining entry acquisition section in the second embodiment of the present disclosure.

FIG. 35 shows an example of a circuit configuration of the remaining entry acquisition section 730-1 in the second embodiment of the present disclosure. Referring to FIG. 35, the remaining entry acquisition section 730-1 includes exclusive OR (XOR) gates 731 to 734.

The XOR gates 731 to 734 output an exclusive OR value of input values. The XOR gates 731 to 734 have two input terminals. To one of the input terminals of the XOR gate 731, the value of a lower bit of the pointer PTR#01 is inputted, and to the other input terminal of the XOR gate 731, the value of a lower bit of the pointer PTR#02 is inputted. The XOR gate 731 outputs an exclusive OR value of the input values to the XOR gate 733.

To one of the input terminals of the XOR gate 732, the value of an upper bit of the pointer PTR#01 is inputted, and to the other input terminal of the XOR gate 732, the value of an upper bit of the pointer PTR#02 is inputted. The XOR gate 732 outputs an exclusive OR value of the input values to the XOR gate 734.

To one of the input terminals of the XOR gate 733, the value of a lower bit of the pointer PTR#00 is inputted, and to the other input terminal of the XOR gate 733, the output of the XOR gate 731 is inputted. The XOR gate 733 outputs an exclusive OR value of the input values as a lower bit of the pointer PTR#03 to the request processing section 500.

To one of the input terminals of the XOR gate 734, the value of an upper bit of the pointer PTR#00 is inputted, and to the other input terminal of the XOR gate 734, the output of the XOR gate 732 is inputted. The XOR gate 734 outputs an exclusive OR value of the input values as an upper bit of the pointer PTR#03 to the request processing section 500. The configuration of the remaining entry acquisition sections 730-2 to 730-4 is similar to that of the remaining entry acquisition section 730-1.

Different values are retained in the pointers PTR#00 to PTR#03 retained by the pointer table. Therefore, even if the pointer PTR#03 is omitted from the pointer table, the remaining entry acquisition section 730-1 can acquire the remaining entry of the pointer PTR#03 by determining a value different from all of the values of the pointers PTR#00 to PTR#02.

In this manner, with the second embodiment of the present disclosure, the remaining entry acquisition sections 730-1 to 730-4 acquire that one of entries of a management table which is not included in the entries indicated by the pointers. Therefore, it is possible to reduce pointers retained by a pointer table by one thereby to reduce the capacity of the pointer table.

3. Third Embodiment

Configuration of the Bus System

Now, a bus bridge according to a third embodiment of the present disclosure is described with reference to FIGS. 36 to 38. The bus bridge of the third embodiment of the present disclosure is different from the bus bridge of the first embodiment of the present disclosure in that the capacity of a management table is reduced. In the following, only differences of the third embodiment of the present disclosure from the first embodiment are described while description of similar configurations of the third embodiment to those of the first embodiment is omitted herein to avoid redundancy. Referring first to FIG. 36, there is shown an example of a configuration of a management table 441-1 in the third embodiment of the present disclosure. The management table 441-1 is similar in configuration to the management table 440-1 in the first embodiment of the present disclosure except that it has a region for retaining a uID in the entry ENT#03. The configuration of the management tables other than the management table 441-1 in the third embodiment of the present disclosure is similar to that of the management table 441-1.

It is to be noted that the entries ENT#00 to ENT#02 in the embodiment described above are an example of the management information retaining entries in the present disclosure. Further, the entry ENT#03 in the embodiment described above is an example of the transaction information retaining entry in the present disclosure.

FIG. 37 illustrates an example of action of the management information registration section 560 in the third embodiment of the present disclosure. Referring to FIG. 37, if one of write destination entry indexes IDX_W[0] to IDX_W[2] is "1," then the management information registration section 560 retains a uID and transaction information into an entry corresponding to write destination entry index IDX_W[j]=1. If the write destination entry index IDX_W[3]=1, then the management information registration section 560 retains transaction information into the entry ENT#03.

Figure 38:
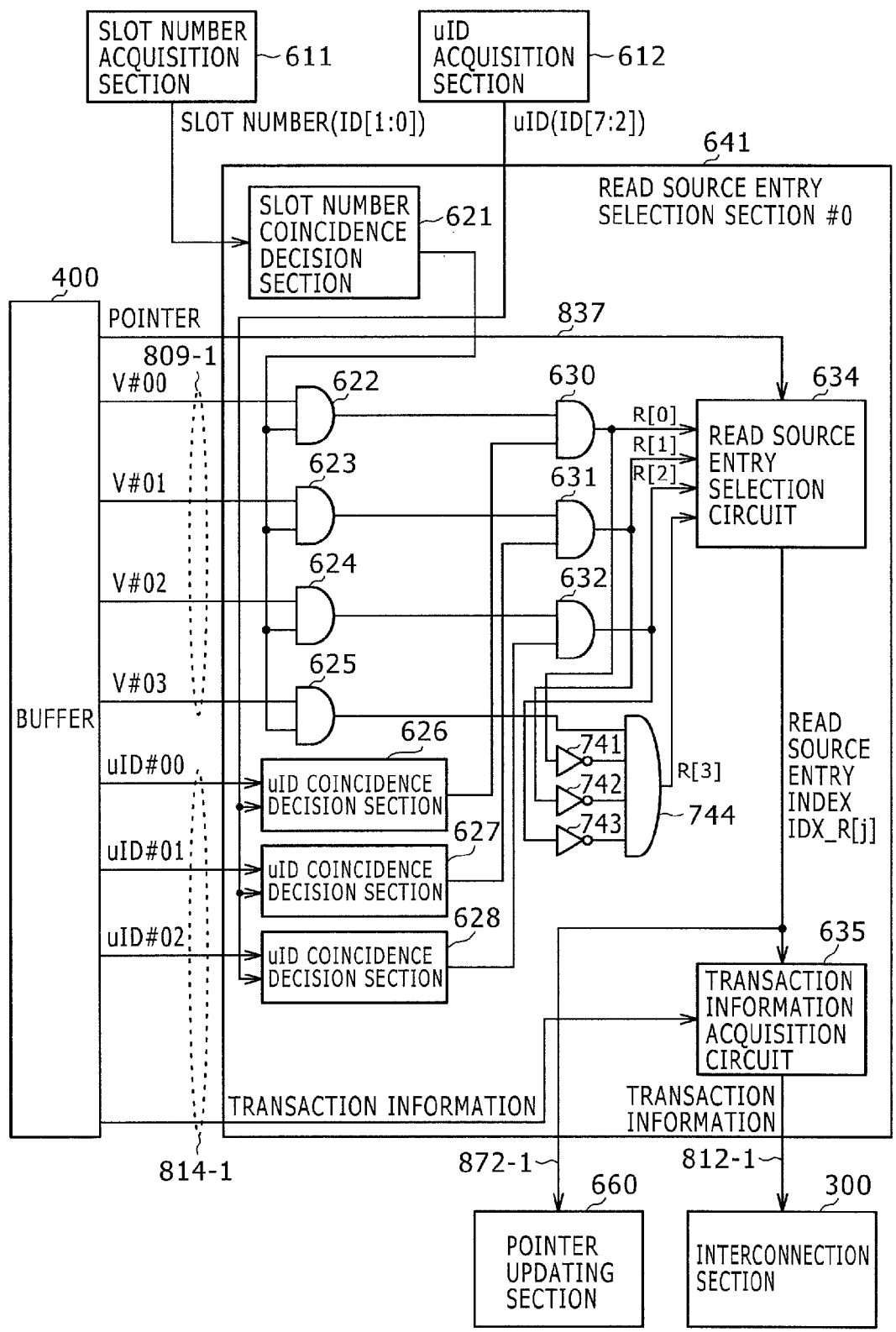
FIG. 38 is a block diagram showing an example of a configuration of a read entry selection section in the third embodiment of the present disclosure.

FIG. 38 shows an example of a configuration of the read source entry selection section 641 in the third embodiment of the present disclosure. Referring to FIG. 38, the read source entry selection section 641 is different from the read source entry selection section 620 in the first embodiment in that it includes invertors 741 to 743 and an AND gate 744 in place of the uID coincidence decision section 629.

The invertors 741 to 743 invert an input value thereto and output the inverted value. To the inverters 741, 742 and 743, outputs of the AND gates 630, 631 and 632 are inputted, respectively. The invertors 741 to 743 invert an input value thereto and output the inverted value to the AND gate 744.

The AND gate 744 outputs a logical AND value of the input values. The AND gate 744 has four input terminals. To one of the four input terminals of the AND gate 744, an output of the AND gate 625 is inputted. To the remaining input terminals of the AND gate 744, outputs of the invertors 741 to 743 are inputted. The AND gate 744 outputs a logical AND value of the input values as a decision result flag R#[3] to the read source entry selection circuit 634.

In this manner, when a uID retained in one of the entries ENT#00 to ENT#02 and a uID relating to a response coincide with each other, the read source entry selection section 641 reads out transaction information corresponding to the coincident uID. On the other hand, if none of the uIDs of the entries ENT#00 to ENT#02 coincides with the uID of the response, then if valid management information is retained in the entry ENT#03, then the read source entry selection section 641 reads out the transaction information of the valid management information. In this manner, the response processing section 600 reads out transaction information from the entry ENT#03 without comparing the uID of the response and the uID corresponding to the entry ENT#03 with each other.

The reason why there is no necessity to compare the uID of the response and the uID corresponding to the entry ENT#03 is described. As described hereinabove with reference to FIG. 1, in the AXI protocol, a slave can issue, in the same transaction, an identifier same as a transaction identifier ID issued by a master. Therefore, any other uID than the uID corresponding to transaction information registered in a management table is not issued by the slave. Accordingly, the bus bridge 200 can decide that, even if a uID is no retained in the entry ENT#03, a uID which does not coincide with any of uIDs in the entries ENT#00 to ENT#02 is a uID corresponding to transaction information of the remaining entry ENT#03. Therefore, in reading out of transaction information of the entries ENT#03, the response processing section 600 need not compare the uID of the response and the uID corresponding to the entry ENT#03 with each other, and there is no necessity to provide a region for retaining a uID.

In this manner, with the third embodiment of the present disclosure, when the entries ENT#00 to ENT#02 are not blank, the request processing section 500 retains transaction information into the entry ENT#03. Then, when none of the uIDs of the entries ENT#00 to ENT#02 coincide with the uID of the response, the response processing section 600 reads out transaction information from the entry ENT#03. Therefore, even if the uID of the response and the uID corresponding to the entry ENT#03 are not compared with each other, the response processing section 600 can read out transaction information from the entry ENT#03. Accordingly, the necessity for provision for retaining a uID in the entry ENT#03 of the management table is eliminated: As a result, the capacity of the management table can be reduced.

4. Fourth Embodiment

Configuration of the Bus System

Figure 39:
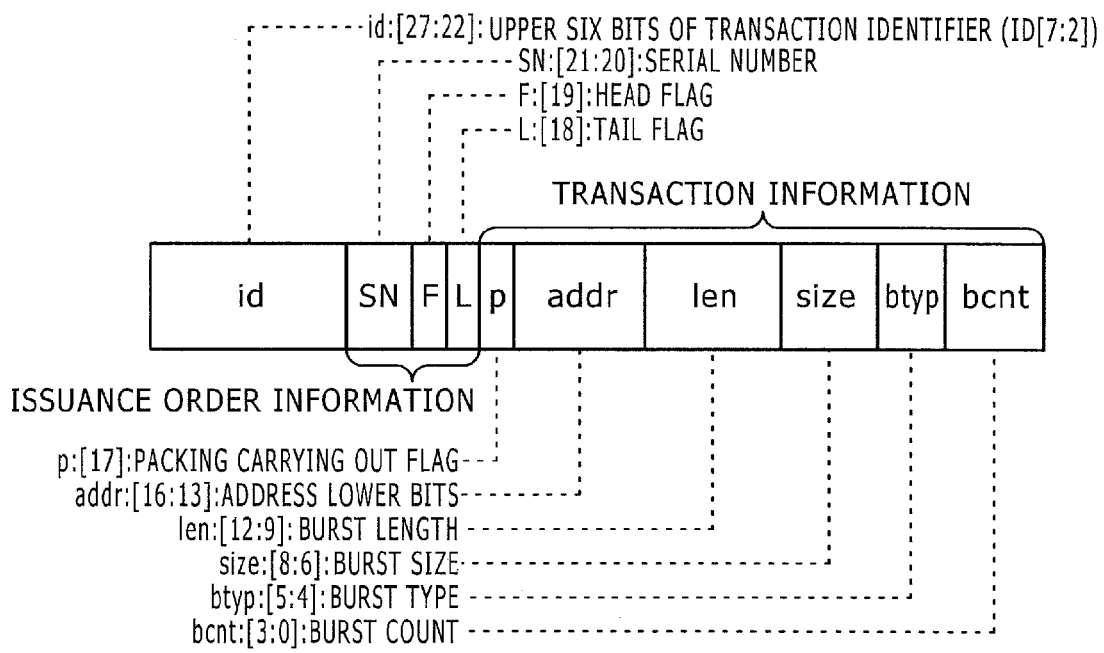
FIG. 39 is a diagrammatic view illustrating an example of management information used in a fourth embodiment of the present disclosure.

A bus bridge of a fourth embodiment of the present disclosure is described with reference to FIGS. 39 to 43. The bus bridge of the fourth embodiment of the present disclosure is different from the bus bridge of the first embodiment in that a management table further retains issuance order information. In the following, only differences of the fourth embodiment of the present disclosure from the first embodiment of the present disclosure are described while description of similar configurations of the fourth embodiment to those of the first embodiment is omitted herein to avoid redundancy. FIG. 39 illustrates an example of management information in the fourth embodiment of the present disclosure. The management information is same as that in the first embodiment except that it further includes issuance order information.

The issuance order information is information for specifying the issuance order of requests. The issuance order information includes a serial number SN, a head flag F and a tail flag L. The serial number SN is a management number indicative of an issuance order number of a request. The number of values which can be taken by the serial number SN is equal to or greater than the number of entries provided in the management table. For example, if the management table includes four entries, information of at least 2 bits is set as the serial number SN.

The head flag F is information of 1 bit indicating that the pertaining management information is the top in the issuance order from within management information whose uID is same in the management table. For example, the head flag F is set to "1" and validated when the management information is the top but is set to "0" and invalidated in any other case.

The tail flag L is information of 1 bit representing that the pertaining management information is the tail in the issuance order from within the management information whose uID is the same in the management table. For example, the tail flag L is set to "1" when the management information is the tail but is set to "0" and invalidated in any other case.

Figure 40:
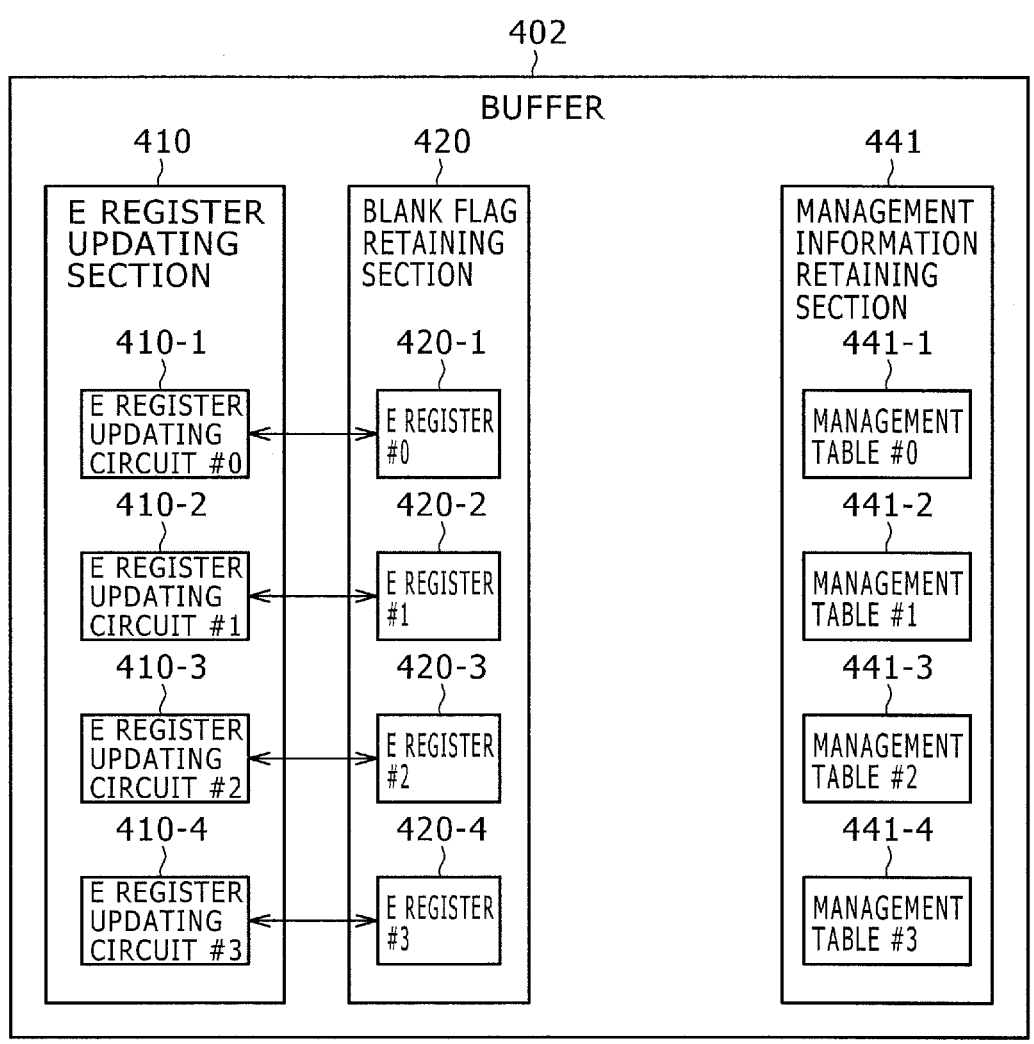
FIG. 40 is a block diagram showing an example of a configuration of a buffer in the fourth embodiment of the present disclosure.

FIG. 40 shows an example of a configuration of a buffer 402 in the fourth embodiment of the present disclosure. Referring to FIG. 40, the buffer 402 is similar in configuration to the buffer 400 in the first embodiment except that it includes a management information retaining section 441 in place of the management information retaining section 440 and does not include the pointer retaining section 430. The management information retaining section 441 retains management information including issuance order information in addition to a uID and transaction information.

Figure 41:
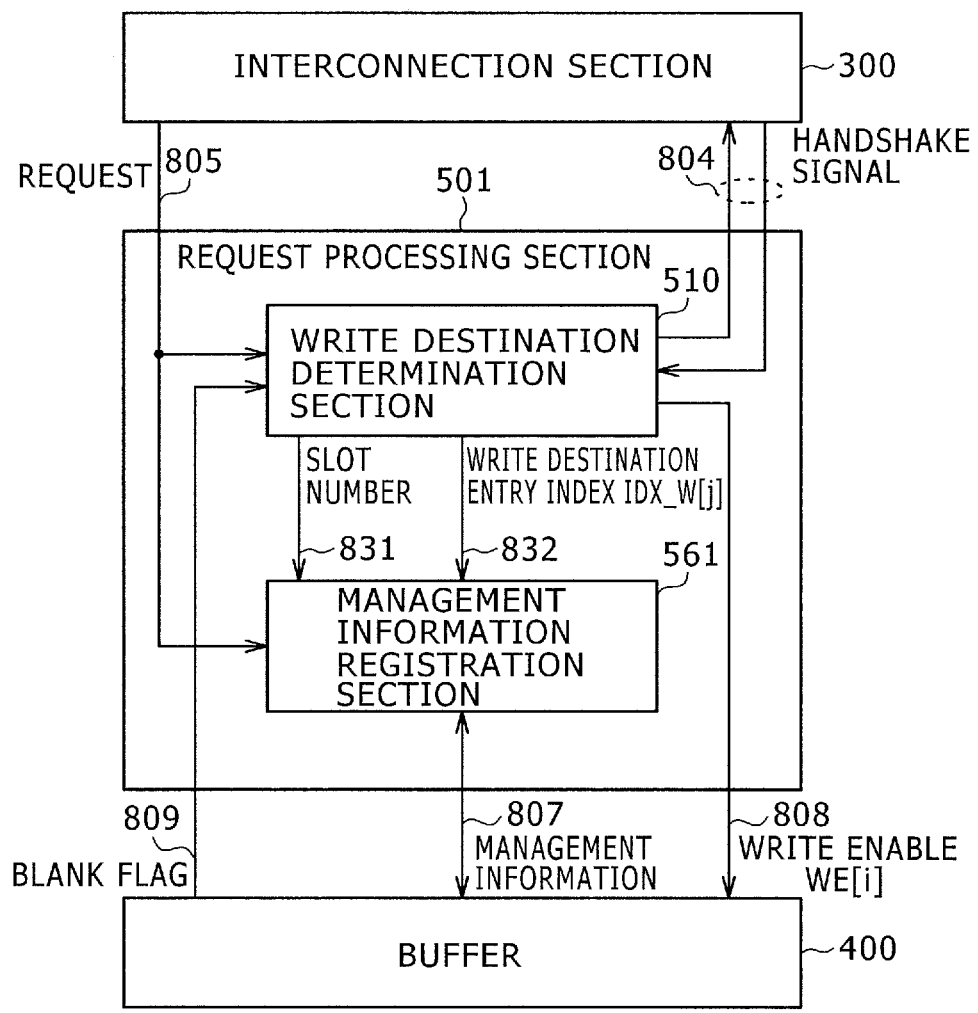
FIG. 41 is a block diagram showing an example of a configuration of a request processing section in the fourth embodiment of the present disclosure.

FIG. 41 shows an example of a configuration of a request processing section 501 in the fourth embodiment of the present disclosure. Referring to FIG. 41, the request processing section 501 is similar in configuration to the request processing section 500 in the first embodiment except that it includes a management information registration section 561 in place of the management information registration section 560.

The management information registration section 561 registers management information further including issuance order information. In particular, the management information registration section 561 decides whether or not management information including a uID same as the uID of a request is retained in a management table corresponding to a time slot. If the uID is not retained, then the request is the top or tail request in the issuance order. Therefore, the management information registration section 561 places "0" into the serial number SN and places "1" into the head flag F and the tail flag L to register the management information. If a uID same as the uID of the request is retained, then the request is the tail request in the issuance order. Therefore, the management information registration section 561 acquires the serial number SN from the management information in which the tail flag L=1 is set from within the retained management information of the same uID. The management information registration section 561 increments the serial number SN and then sets the incremented value to the management information to be registered newly, and then places "0" into the head flag F and places "1" into the tail flag L. Then, the management information registration section 561 updates the tail flag L to "0" in the retained management information of the same uID.

Figure 42:
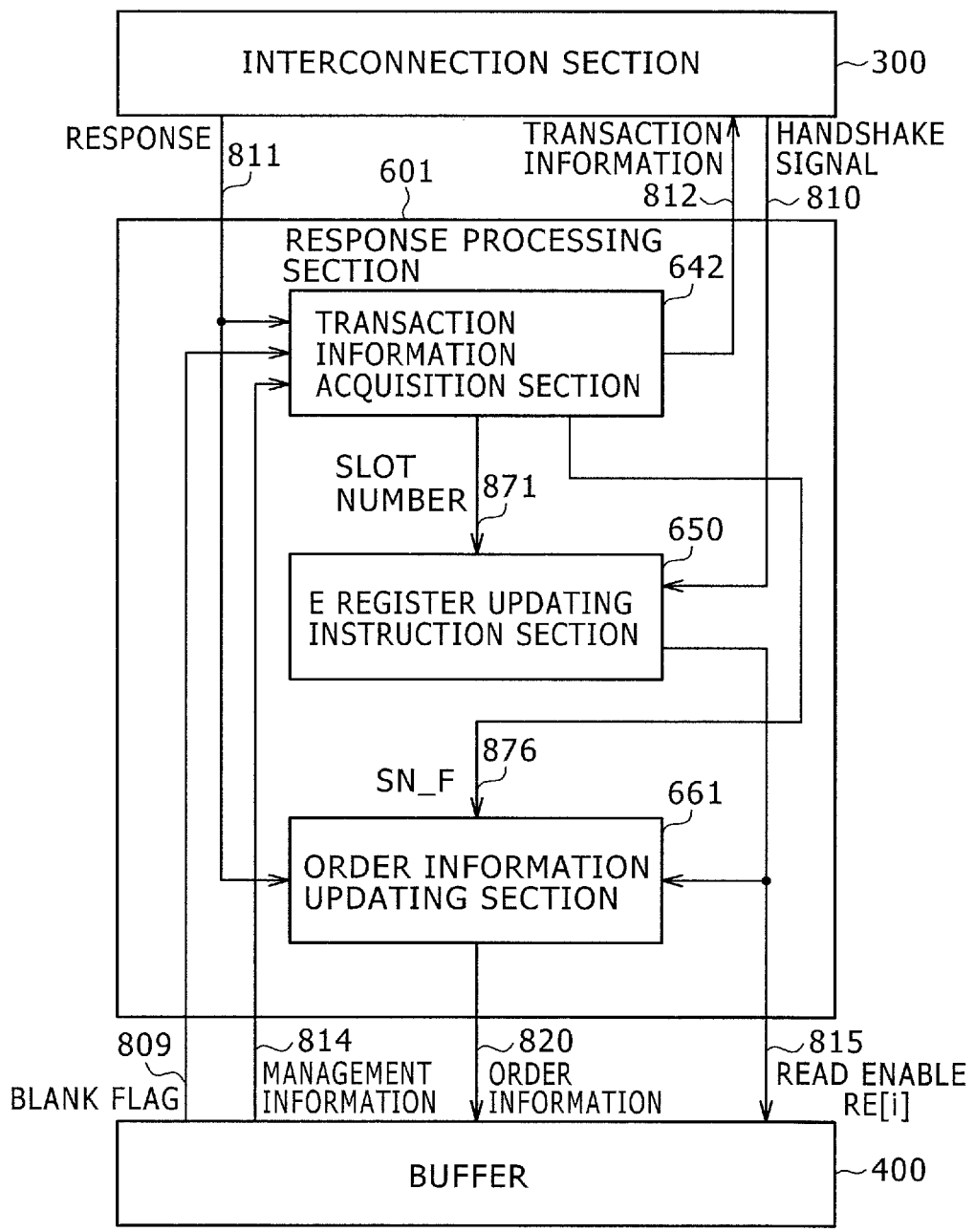
FIG. 42 is a block diagram showing an example of a configuration of a response processing section in the fourth embodiment of the present disclosure.

FIG. 42 shows an example of a configuration of a response processing section 601 in the fourth embodiment of the present disclosure. Referring to FIG. 42, the response processing section 601 is similar in configuration to the response processing section 600 in the first embodiment except that it includes a transaction information acquisition section 642 and an order information updating section 661 in place of the transaction information acquisition section 610 and the pointer updating section 660.

The transaction information acquisition section 642 acquires transaction information corresponding to a response. The transaction information acquisition section 642 determines entries which retain a uID coincident with the uID of the response from within a management table corresponding to a slot specifying bit string of the response. The transaction information acquisition section 642 reads out transaction information from that of the determined entries which has the head flag F=1 retained therein. The transaction information acquisition section 642 notifies the order information updating section 661 of the serial number SN retained in the entry as a head number SN_F through a signal line 876.

The order information updating section 661 updates issuance order information. The order information updating section 661 receives a response from the interconnection section 300 and a head number SN_F and a read enable signal RE[i] from the transaction information acquisition section 642. The order information updating section 661 selects a management table indicated by the read enable signal RE[i]. The order information updating section 661 determines an entry in which a uID same as the uID of the request and a serial number SN same as a number obtained by incrementing the head number SN_F are retained from within the management table. The order information updating section 661 updates the head flag F in the determined entry to "1."

Figure 43:
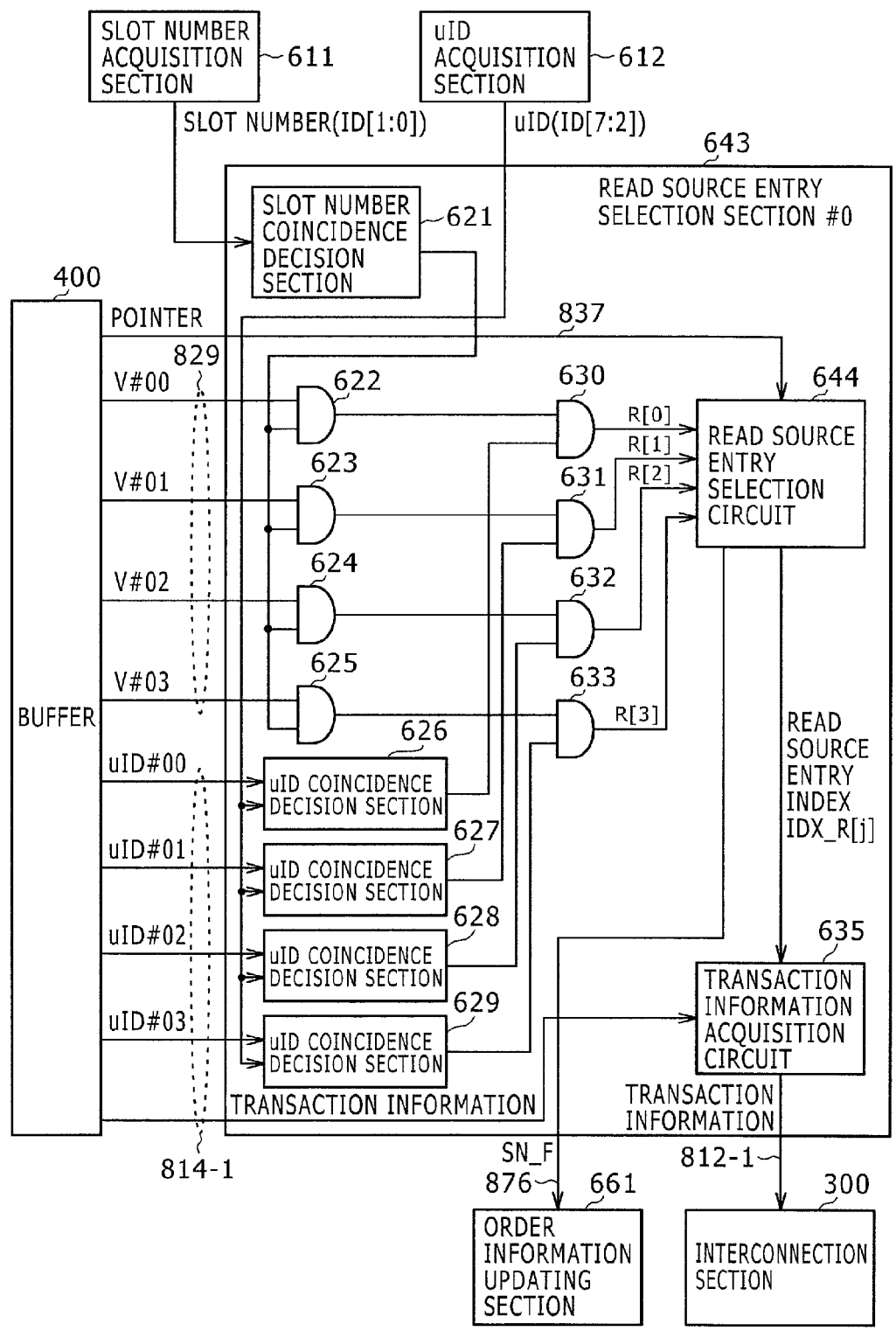
FIG. 43 is a block diagram showing an example of a configuration of a read source entry selection section in the fourth embodiment of the present disclosure.

FIG. 43 shows an example of a configuration of a read source entry selection section 643 in the fourth embodiment of the present disclosure. Referring to FIG. 43, the read source entry selection section 643 is similar in configuration to the read source entry selection section 620 in the first embodiment except that it includes a read source entry selection circuit 644 in place of the read source entry selection circuit 634.

The read source entry selection circuit 644 selects an entry from which transaction information is to be read out. The read source entry selection circuit 644 selects, from among entries wherein R[j]=1, that entry in which the head flag F=1 is retained and produces a write destination entry index IDX_W [j]. Further, the read source entry selection circuit 644 notifies the order information updating section 661 of the serial number SN retained in the selected entry as the head number SN_F.

It is to be noted that, while, in the description of the fourth embodiment of the present disclosure, the serial number SN is placed as order information, the serial number SN may be any number only if it increases or decreases in accordance with the issuance order and is not limited to a sequential number (SN).

Further, while it is described above that the issuance order information includes the head flag F and the tail flag L, it may be configured such that it does not include at least one of them.

If the issuance order information is configured such that it includes the head flag F but does not include the tail flag L, then the request processing section 501 acquires management information at the tail end based on the head flag F. For example, the request processing section 501 successively decrements the serial number SN of the management information of the head flag F=1 and acquires the management information of the serial number SN which exhibits coincidence first from within the management information of the same uID as the tail end. On the other hand, if the issuance order information is configured such that it includes the tail flag L but does not head flag F, then the response processing section 601 acquires the management information at the top based on the tail flag L. For example, the response processing section 601 successively increments the serial number SN of the management information of the tail flag L=1, and acquires the management information of the serial number SN which exhibits coincidence first from within the management information of the same uID as the top.

However, if the issuance order information is configured such that it does not include any of the head flag F and the tail flag L, then the request processing section 501 selects, from among those entries which retain a uID same as the uID of the request, that entry which retains a maximum serial number SN as the tail end. Further, the response processing section 601 selects, from among those entries which retain a uID same as the uID of the request, that entry which retains a minimum serial number SN as the top. Then, after the response processing section 601 reads out transaction information, it decrements the serial number SN in all of the entries which retain a uID same as the uID of the response.

In this manner, with the fourth embodiment of the present disclosure, since the bus bridge 200 retains issuance order information in an associated relationship with transaction information, it can read out transaction information corresponding to a response in accordance with the issuance order of requests.

5. Fifth Embodiment

Configuration of the Bus System

Figure 44:
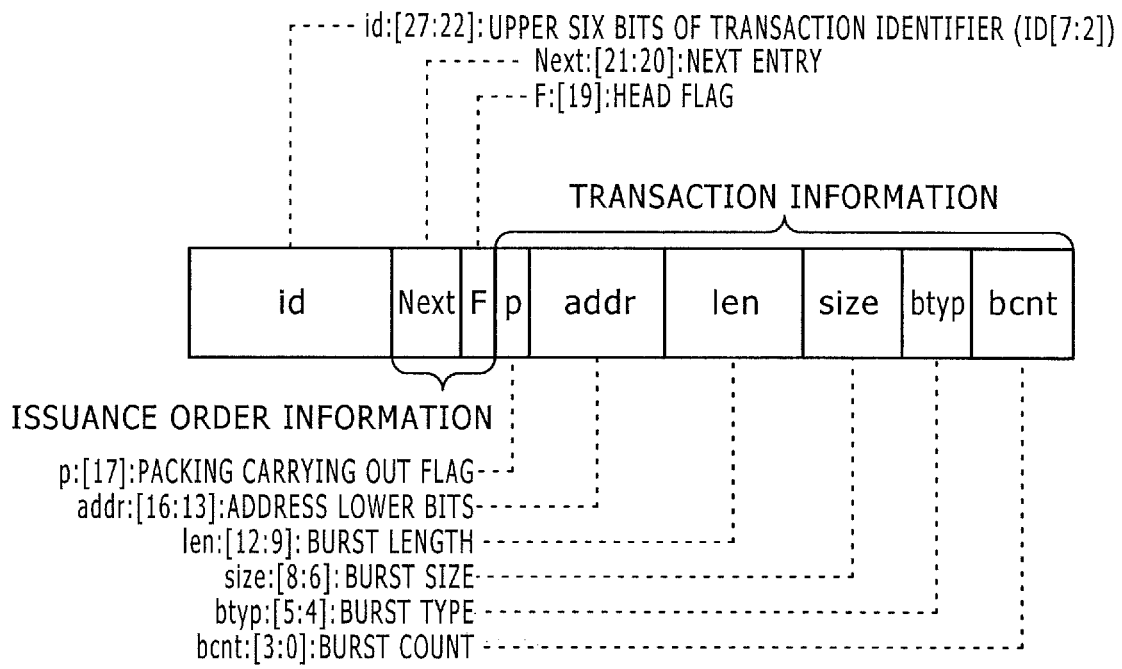
FIG. 44 is a diagrammatic view illustrating an example of management information in the fifth embodiment of the present disclosure.

A bus bridge according to a fifth embodiment of the present disclosure is described with reference to FIGS. 44 and 45. The bus bridge of the fifth embodiment of the present disclosure is different from the bus bridge of the fourth embodiment of the present disclosure in that a management table retains a next entry Next. In the following, only differences of the fifth embodiment of the present disclosure from the fourth embodiment are described while description of similar configurations of the fifth embodiment to those of the fourth embodiment is omitted herein to avoid redundancy. In particular, FIG. 44 illustrates an example of management information in the fifth embodiment of the present disclosure. The management information is similar to the management information in the fourth embodiment of the present disclosure except that it includes a next entry Next in place of the serial number SN and the tail flag L.

The next entry Next is information indicative of the position of an entry in which a piece of management information next to a pertaining piece of management information in the issuance order is placed. In the case of the tail end piece of management information in the issuance order, information indicative of the position of an entry in which the piece of management information itself is retained is set as the next entry Next. A number of possible values of the next entry Next is not less than a number of entries in a management table. For example, if the number of entries in each management table is four, a next entry Next of at least two bits is set.

It is to be noted that the next entry Next in the embodiment described above is an example of a piece of next position information in the present disclosure.

The request processing section in the fifth embodiment of the present disclosure is similar in configuration to the request processing section 501 in the fourth embodiment of the present disclosure except that the next entry Next is set in place of the serial number SN and the tail flag L. It is to be noted that the request processing section in the fifth embodiment decides whether or not management information is the tail end management information depending upon whether an entry indicated by the next entry Next represents the position of the entry in which the management information itself is placed.

Figure 45:
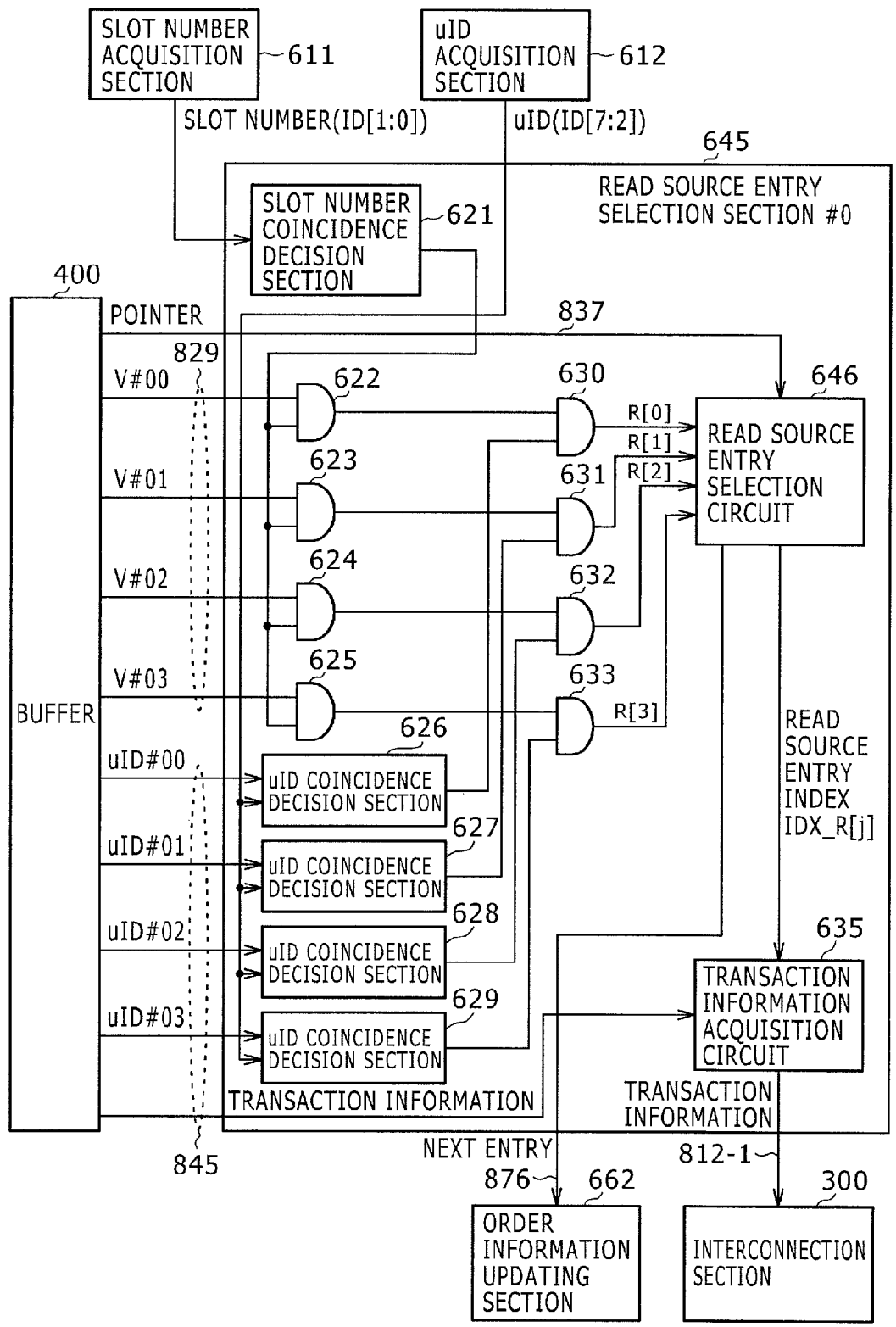
FIG. 45 is a block diagram showing an example of a configuration of a read source entry selection section in the fifth embodiment of the present disclosure.

FIG. 45 shows an example of a configuration of a read source entry selection section 645 in the fifth embodiment of the present disclosure. Referring to FIG. 45, the read source entry selection section 645 is similar in configuration to the read source entry selection section 643 in the fourth embodiment described hereinabove with reference to FIG. 43 except that it includes a read source entry selection circuit 646 in place of the read source entry selection circuit 644.

The read source entry selection circuit 646 selects an entry from which transaction information is to be read out. The read source entry selection circuit 646 is similar to the read source entry selection circuit 644 in the fourth embodiment except that it notifies an order information updating section 662 of the next entry Next retained in the selected entry in place of the head number SN_F.

The order information updating section 662 updates the head flag F in an entry indicated by the received next entry Next to "1."

It is to be noted that, while it is described that, in the fifth embodiment of the present disclosure, the issuance order information includes the head flag F, also it is possible to adopt another configuration wherein the issuance order information does not include the head flag F.

In the case where the configuration wherein the head flag F is not included is used, the response processing section retains all entries which retain a uID same as the uID of a response. The response processing section selects, from among the acquired entries, that entry in which a next entry Next which is not referred to by any other next entry Next is retained as the top.

In this manner, with the fifth embodiment of the present disclosure, the bus bridge 200 can readily acquire tail end management information from within management information corresponding to a request by setting a next entry Next in advance.

It is to be noted that any of the processing procedures described in connection with the preferred embodiments of the present disclosure may be grasped as a method which includes the processing procedure or as a program for causing a computer to execute the processing procedure or else as a recording medium on or in which the program is stored. The recording medium may be, for example, a CD (Compact Disc), an MD (Mini Disc), a DVD (Digital Versatile Disk), a memory card, a Blu-ray disk (registered trademark) or the like.

The present disclosure contains subject matter related to that disclosed in Japanese Priority Patent Application JP 2010-271008 filed in the Japan Patent Office on Dec. 6, 2010, the entire content of which is hereby incorporated by reference.

While preferred embodiments of the present disclosure have been described using specific terms, such description is for illustrative purpose only, and it is to be understood that changes and variations may be made without departing from the spirit or scope of the following claims.

What is claimed is:

1. An interconnection apparatus comprising:
an interconnection section configured to transfer a request from a master interface bus to a slave interface bus and to transfer a response from said slave interface bus to said master interface bus, a slot number within said request specifying a time slot during which said interconnection section is permitted to transfer said response to said master interface bus;
a request processing section configured to load said slot number into a management table, said request commanding said request processing section to update said management table with said slot number; and
a response processing section configured to read out said slot number from said management table, said response commanding said response processing section to obtain said slot number from said management table.

2. The interconnection apparatus according to claim 1, wherein said interconnection section is configured to prohibit transfer of said response to said master interface bus during a time period other than said time slot.

3. The interconnection apparatus according to claim 1, wherein said slave interface bus is configured to output said response only after receiving said request.

4. The interconnection apparatus according to claim 1, wherein masters are configured to transfer master requests onto said master interface bus, said request being one of the master requests from one of the masters.

5. The interconnection apparatus according to claim 4, wherein slaves are configured to transfer slave responses onto said slave interface bus, said response being one of the slave responses from one of the slaves.

6. The interconnection apparatus according to claim 5, wherein one or more of said slaves is controllable by said one of said masters.

* * * * *